(12) United States Patent
Graham, Jr. et al.

(10) Patent No.: US 6,402,028 B1
(45) Date of Patent: Jun. 11, 2002

(54) INTEGRATED PRODUCTION OF SMART CARDS

(75) Inventors: Harry E. Graham, Jr., Walnut Creek; Marc B. Kekicheff, Palo Alto, both of CA (US); Ricky Jay Nablo, Eden Prairie; William W. Haeuser, Prior Lake, both of MN (US)

(73) Assignee: Visa International Service Association, Foster City, CA (US)

( * ) Notice: Subject to any disclaimer, the term of this patent is extended or adjusted under 35 U.S.C. 154(b) by 0 days.

(21) Appl. No.: 09/287,588

(22) Filed: Apr. 6, 1999

(51) Int. Cl.[7] .................................................. G06K 5/00
(52) U.S. Cl. ........................ 235/380; 235/380; 235/449; 235/492; 235/493
(58) Field of Search ............................. 235/380, 382.5, 235/449, 492, 493; 705/44, 41

(56) References Cited

U.S. PATENT DOCUMENTS

| | | | | |
|---|---|---|---|---|
| 4,866,259 A | | 9/1989 | Bonnemoy | 235/475 |
| 5,012,074 A | * | 4/1991 | Masada | 235/379 |
| 5,442,165 A | | 8/1995 | Atsumi et al. | 235/492 |
| 5,578,808 A | | 11/1996 | Taylor | 235/380 |
| 5,883,452 A | * | 3/1999 | Masuda | 235/380 |
| 5,889,941 A | | 3/1999 | Tushie et al. | 235/380 |

FOREIGN PATENT DOCUMENTS

EP 0328289 8/1989

(List continued on next page.)

OTHER PUBLICATIONS

"Financial Transaction Cards–Security Architecture of Financial Transaction System Using Integrated Circuit Cards– Part 1: Card Life Cycle", Sep. 15, 1991, International Standard, ISO 10202–1, First Edition.

*Primary Examiner*—Karl D. Frech
*Assistant Examiner*—Uyen-Chau N Le
(74) *Attorney, Agent, or Firm*—Beyer Weaver & Thomas, LLP

(57) ABSTRACT

Automated mass production of smart cards is applicable to either single application or multi-application smart cards, and can be customized. A scripting language combines all of the production aspects of a card into a script. The script is applied to a card production system that automatically produces a custom smart card. To produce a script, a card profile, application profiles, and an issuer profile are used. The card profile describes the resources available on the card and documents the card's software infrastructure, the available resources, memory, applications already on place on the card, the life cycle status of all applications, and physical attributes of the card. Application requirements are documented in an application profile. An application profile identifies the application source code and includes the resource requirements of an application such as memory, operating system version, security, and card physical requirements. For a given card product, the selected application profiles are compared for compatibility. These profiles are checked for compatibility with any number of card profiles to find a suitable card profile. A script is built based upon the selected application profiles and card profile. The script is a natural language description of the functions and data required to produce a single- or multi-application smart card. This creation includes initialization and personalization, and the loading of application code when not already in place on the card. An updated card profile is created when a script is produced. The updated profile describes the card and its resources after an application has been loaded, and is used to create a script to load, initialize and personalize applications onto a card post-issuance, or in a multi-step production process.

36 Claims, 18 Drawing Sheets

FOREIGN PATENT DOCUMENTS

| | | |
|---|---|---|
| EP | 0706150 | 4/1996 |
| FR | 2695235 | 3/1994 |
| WO | 92/17856 | * 10/1992 |
| WO | WO97/39424 | 10/1997 |
| WO | 98/09257 | 3/1998 |
| WO | 98/52162 | 11/1998 |

* cited by examiner

SCRIPT SEQUENCING TABLE

| | |
|---|---|
| CARD | EMBOSS |
| CARD | MAGNETIC STRIPE |
| CARD | INITIALIZATION |
| APP | LOAD |
| APP | INSTALL |
| APP | PERSONALIZATION |

220

FIG. 10

CONFLICT DETERMINATION TABLE

| | | | | |
|---|---|---|---|---|
| CARD | Card_OP_Version | == | APP | App_OP_Version |
| CARD | Card_CryptoCPU | == | APP | App_CryptoCPU |
| CARD | Card_RAM_Available | >= | APP | App_RAM_Required |
| CARD | Card_EE_Available | >+ | APP | App_Code + App_Data |
| CARD | Card_JCVM_Version | == | APP | App_JCVM_Version |
| CARD | Card_EMV_Name | == | APP | App_EMV_Name |
| CARD | Card_EMV_Version | == | APP | App_EMV_Version |
| CARD | Card_Domain_Name | == | APP | App_Domain_Name |
| CARD | Card_Domain_Version | == | APP | App_Domain_Version |

222

FIG. 11

INTEGRATED PRODUCTION OF SMART CARDS

FIELD OF THE INVENTION

The present invention relates generally to smart cards. In particular, the present invention relates to a system and method for standardized, integrated and automated production of smart cards by using a script language.

BACKGROUND OF THE INVENTION

The present invention is applicable to smart cards. Also termed chip cards, integrated circuit cards, memory cards or processor cards, a smart card is typically a credit card-sized plastic card that includes one or more semiconductor integrated circuits. A smart card can interface with a point-of-sale terminal, an ATM, or with a card reader integrated with a computer, telephone, vending machine, or a variety of other devices. The smart card may be programmed with various types of functionality such as a stored-value application, a credit or debit application, a loyalty application, cardholder information, etc. Although a plastic card is currently the medium of choice for smart cards, it is contemplated that a smart card may also be implemented in a smaller form factor, for example, it may attach to a key chain or be as small as a chip module. A smart card may also be implemented as part of a personal digital assistant, telephone, or take a different form. The below description provides an example of the possible elements of a smart card, although the present invention is applicable to a wide range of types of smart cards.

A smart card may include a microprocessor, random access memory (RAM), read-only memory (ROM), non-volatile memory, an encryption module (or arithmetic unit), and a card reader (or terminal) interface. Other features may be present such as optical storage, flash EEPROM, FRAM, a clock, a random number generator, interrupt control, control logic, a charge pump, power connections, and interface contacts that allow the card to communicate with the outside world. Of course, a smart card may be implemented in many ways, and need not necessarily include a microprocessor or other features.

The microprocessor is any suitable central processing unit for executing commands and controlling the device. RAM serves as temporary storage for calculated results and as stack memory. ROM stores the operating system, fixed data, standard routines, look up tables and other permanent information. Non-volatile memory (such as EPROM or EEPROM) serves to store information that must not be lost when the card is disconnected from a power source, but that must also be alterable to accommodate data specific to individual cards or changes possible over the card lifetime. This information includes a card identification number, a personal identification number, authorization levels, cash balances, credit limits, and other information that may need to change over time. An encryption module is an optional hardware module used for performing a variety of encryption algorithms. Of course, encryption may also be performed in software. *Applied Cryptography,* Bruce Schneier, John Wiley & Sons, Inc., 1996 discusses suitable encryption algorithms and is hereby incorporated by reference.

The card reader interface includes the software and hardware necessary for communication with the outside world. A wide variety of interfaces are possible. By way of example, the interface may provide a contact interface, a close-coupled interface, a remote-coupled interface, or a variety of other interfaces. With a contact interface, signals from the integrated circuit are routed to a number of metal contacts on the outside of the card which come in physical contact with similar contacts of a card reader device. A smart card may include a traditional magnetic stripe to provide compatibility with traditional card reader devices and applications, and may also provide a copy of the magnetic stripe information within the integrated circuit itself for compatibility.

Various mechanical and electrical characteristics of a smart card and aspects of its interaction with a card reader device are described in *Smart Card Handbook,* W. Rankl and W. Effing, John Wiley & Sons, Ltd., 1997, and are defined by the following specifications, all of which are incorporated herein by reference: *Visa Integrated Circuit Card Specification,* Visa International Service Association, 1996; *EMV Integrated Circuit Card Specification for Payment Systems, EMV Integrated Circuit Card Terminal Specification for Payment Systems, EMV Integrated Circuit Card Application Specification for Payment Systems,* Visa International, Mastercard, Europay, 1996; and *International Standard; Identification Cards—Integrated Circuit(s) Cards with Contacts, Parts* 1–6, International Organization for Standardization, 1987–1995.

In creating such a smart card, multiple steps are typically performed at different physical locations. One of these steps is the installation of application software. Applications intended for a smart card are typically developed by a smart card manufacturer or third party at the direction of a card issuer. The card issuer is often a bank or other financial institution, but may also be a telecommunication network operator, a merchant operating a fidelity or loyalty program, or even an agent acting for an issuer. The applications, typically written in assembly code for a specific chip, are given to the chip manufacturer that produces such chips. The chip manufacturer then burns the application software into chips on a silicon wafer. The wafer is then cut up and the chips are then sent back to the smart card manufacturer. The smart card manufacturer then embeds the chips into plastic cards.

Once the chips are embedded into plastic cards, the card manufacturer performs an initialization process. During initialization, data and data structures that are common to an entire batch of cards are installed on the cards. For example, data common to an entire batch of cards may include printing of graphics for bank or network logos, information such as a bank identification number (BIN), or the currency used by the application, such as U.S. dollars or German marks.

After initialization, a personalization process typically occurs. The personalization process may be performed by the card manufacturer, but is often performed at a specialized personalization bureau. During personalization, the smart card is loaded with data which uniquely identifies the card. For example, the personalization data can include a maximum value of a stored value card, a personal identification number (PIN), a cardholder account number, the expiration date of the card, or cryptographic keys.

The personalization bureau is typically a third party contracted by the smart card issuer to personalize their smart cards. The personalization bureau is often in a location different from the location of the smart card issuer or that of the card manufacturer. For each batch of cards, the cardholder information data must typically be pre-processed by the issuer (sorted, formatted and placed in a personalization file). Typically, each personalization bureau requires a specific file format. The issuer must modify its cardholder information data for each personalization bureau that the issuer deals with. Otherwise, the personalization bureau must modify its file formats for the different issuers with which it operates. Either way, the personalization data file must typically be redesigned for almost every change made to the specifications for a batch of cards. During personalization, personalization equipment coupled to a security device is typically used. The personalization equipment contains software which interacts with the smart card software to load personalization data. The security device is used to store cryptographic keys or other sensitive information which may be needed in the personalization process. After personalization, the cards are distributed to cardholders.

One technique for smart card personalization is described in U.S. patent application Ser. No. 08/755,459 (U.S. Pat. No. 5,889,941), entitled "System and Apparatus for Smart Card Personalization," assigned to UbiQ Incorporated. This application teaches a smart card personalization system that maintains a database containing card application data, card operating systems data, issuer templates of input cardholder data, and personalization equipment data, to dynamically build configurations to produce issued (personalized) smart cards.

Conventionally, equipment associated with smart card production is pre-programmed. Every piece of software is individually customized for a particular set of specifications for a batch of cards, such as for the combination of the smart card application and the chip itself. Accordingly, for virtually every change made to the specifications for a batch of smart cards software must be rewritten for each piece of equipment used in the smart card manufacturing process. This individual rewriting of software for virtually every piece of equipment used in smart card manufacturing can be very time consuming, labor intensive, and expensive.

Additionally, the conventional methods of preparing smart cards are not practical for preparing multi-application smart cards. A multi-application smart card may come in many forms and from a variety of manufacturers. In one example, the smart card may use the Multi-application Operating System (MULTOS) managed by Maosco Ltd. In another example, the multi-application smart card may use the "Open Platform" architecture which is described in further detail in U.S. patent application Ser. Nos. 09/046,993 and 09/046,994, both of which are assigned to Visa International Service Association and both incorporated herein by reference for all purposes. In general, these above types of smart cards are referred to herein as multi-application smart cards.

A single-application (or traditional) smart card typically comes with its software application already permanently burned into the chip on the card. It is generally not feasible to add more applications to the card. Also, applications written for a card manufactured by a first manufacturer (for example, Gemplus), would not necessarily run on a card manufactured by a second manufacturer (for example, Schlumberger). With an Open Platform smart card, applications are designed to be capable of being added to a card post-issuance, and applications should be designed to be capable of being run on any Open Platform card, regardless of the card manufacturer. These Open Platform smart cards may allow the loading of an application and/or objects from an application server onto a card via a card acceptance device. This loading can occur either before or after card issuance in a secure and confidential manner. Additionally, the Open Platform smart card facilitates multiple ownership and control of various applications of the smart card.

In one embodiment of the Open Platform card, the card when produced contains the software infrastructure needed to support the loading, initialization, personalization and the running of applications. This infrastructure may include the card's operating system, a card executive (the main control program for the chip), a card domain (the software application representing the issuer), and any number of security domains (each representing an application provider). In one particular embodiment suitable for use with applications written in the JAVA programming language, the infrastructure includes a JAVA interpreter (the JAVA "virtual machine". The JavaCard™ virtual machine (JCVM) works well in this embodiment.

An Open Platform smart card may also provide confidential information to an application in a smart card. In a multi-application smart card, a privileged application referred to as a security domain is used as a confidential representative of an application provider. The security domain contains cryptographic keys which are kept confidential from the smart card issuer, thus allowing separation of cryptographic security between the issuer and the application provider. When a new application is loaded onto a smart card, the newly loaded application utilizes its associated security domain's cryptographic service. A privileged application representing the issuer, referred to as a card domain, approves of commands (such as commands for initialization and personalization) by invoking the security domain's cryptographic service. In this manner, a post-issuance download of an application onto an issued Open Platform smart card can be accomplished.

As mentioned above, the conventional methods of preparing smart cards are not practical for preparing multi-application smart cards. Few actors are involved in single-application smart card production: one issuer; one or two card manufacturers; and one or two personalization bureaus. True multi-application smart cards will involve new and more actors, including one or more application providers who develop/operate applications and contract with the primary issuer to load their applications onto the issuer's cards. Each of these application providers may themselves contract with their own (and different) personalization bureaus. Such multi-application smart cards might then encounter a multi-step load and personalization process, at multiple locations (one for each of the different applications), before they could be actually issued. Or, such multi-application smart cards might be issued with only a partial set of loaded and personalized applications, and might require further personalization.

Conventional methods for issuing and distributing cards require that hardware used to initialize and personalize smart cards be reprogrammed for each new combination of a chip and a particular set of applications. Additionally, there are typically no provisions for loading application code onto the card, other than the code burned into card silicon at manufacture.

The production of cards with multiple applications can be extremely complex and is not often attempted. For every different combination of multiple applications to be loaded onto the smart card and personalized, the equipment used during the smart card manufacturing process would need to be reprogrammed for each different combination of applications. Similarly, for every different combination of multiple applications, the personalization data file would need to be redesigned for each combination. For every different relationship between the issuer and the multiple application providers, the personalization data would need to be redesigned and split into different files for each different relationship. Accordingly, even if it were practical to produce multi-application cards via the conventional card manufacturing process, only a predetermined set of chips and applications could be produced without incurring a substantial cost per card.

It would be desirable to automate the process of manufacturing smart cards such that large batches of smart cards could be manufactured, while allowing each card to be customized for each issuer, application provider, and cardholder. It would also be desirable to mass produce multi-application smart cards at a reasonable cost. It would be further desirable to allow unique variations in the combination of applications loaded onto an individual card, and further, to allow unique variations to be loaded onto individual cards post-issuance. Further, it would also be desirable to be able to reproduce a lost or stolen card at locations other than at the card issuer or personalization agent, such as in a bank branch, without a substantial loss of time.

It can also be difficult to load applications onto a card post-issuance when other applications have already been loaded. If there is not enough memory for a new application, if a new application would conflict with an existing application, or if the operating system version required by the application is different from that currently on the card, it might be inadvisable to load a new application. At the very least, a new application might not function even if a post-issuance load were successful. Therefore, it would further be desirable to be able to successfully load applications onto issued smart cards with assurances that the load will be successful and the application will function as desired.

SUMMARY OF THE INVENTION

To achieve the foregoing, and in accordance with the purpose of the present invention, a system and method are disclosed that allow automated mass preparation of smart card data and mass production of smart cards. These smart cards can be traditional single application smart cards or multi-application smart cards which include more than one application or have the ability to load more than one application. Additionally, an embodiment of the present invention allows mass production of smart cards which may be customized for each individual card issuer, application provider, and cardholder.

The automated process according to an embodiment of the present invention uses a scripting language which allows the combination of all production aspects of a card in a unified script. This script is automatically produced using the scripting language and its particular syntax rules and can be easily altered and customized. The script is used in a card production system which can automatically produce a custom smart card. In one embodiment of the present invention, a customer may go to a single location (such as a bank branch), and obtain a custom smart card produced for him during a single visit to the bank. Other embodiments of the present invention also allow a card to be updated with new or revised applications post-issuance.

According to one embodiment of the present invention, a script is produced for use with card manufacturing equipment such that the card manufacturing equipment need not be reprogrammed for every change in specific card requirements. The card manufacturing equipment follows the directions of the script to create a smart card complying with the specific card requirements. The script itself may easily be altered to allow customization of a smart card.

To automate the complex process of creating smart cards, smart cards are described using different profiles, for example, a card profile, application profiles, and an issuer profile. The card profile, for example, describes the resources available on the card and documents the card's software infrastructure, the available resources (including all types of memory), any applications already on place on the card, the life cycle status of those applications, and physical attributes of the card. To help determine which applications may coexist on the card, application requirements are documented in an application profile. An application profile identifies the application source code and includes the resource requirements of an application such as memory, operating system version, security, and card physical requirements.

For a given smart card to be produced, the selected application profiles of applications to be installed on the card are compared to ensure their compatibility. These profiles are also checked for compatibility with any number of card profiles to find a suitable card profile. A card creation script may then be built based upon the selected application profiles and card profile. In one embodiment, the card creation script is a natural language description of the functions and data required to create a multi-application or a traditional (single application) smart card. This card creation script may encompass the initialization and personalization for both types of cards, and may further include the loading of application code for multi-application cards.

In one embodiment the script is vendor-independent and is a standardized method for describing the creation of virtually any smart card. A script is machine readable, thus allowing vendors who write their own parsers to use the script to drive the controllers of their own personalization equipment. The initialization portion of the script may be used to drive the equipment performing initialization. Alternatively, the entire script may be used to drive a desktop unit that produces one-off cards in a bank branch. Scripts for suites of applications may be created and archived allowing for creation of a single custom card or for the creation of millions of cards. In another embodiment, the script drives a remote server that communicates with a local card reader interface into which the smart card is physically inserted, thus allowing remote on-line personalization and/or initialization, such as in a post-issuance process where the card is in the hands of the cardholder.

Thus, embodiments of the present invention allow automation of what is now a complex manual process. The loading of applications onto cards is automatic using techniques of the present invention; the previously manual process of programming the initialization and personalization hardware for each combination of card and applications may also be automated according to embodiments of the invention. In this manner, embodiments of the invention permit rapid development and deployment of smart cards.

In a further embodiment of the invention, an updated card profile is also produced by the script builder. The updated card profile describes the resources of the card once one or more applications have been loaded and the card issued. Thus, the original card profile (describing a blank card) is updated to describe a particular card product. The updated card profile may be used when it is desired to load applications onto a card post-issuance. By comparing the updated card profile to the desired application profiles to be loaded post-issuance, a new card script may be created that will succeed in loading the applications and provide assurances that the new applications will function as desired.

BRIEF DESCRIPTION OF THE DRAWINGS

FIG. 10 is an example of a script sequencing table.

FIG. 11 is an example of a conflict determination table.

DETAILED DESCRIPTION OF THE INVENTION

Figure 1:
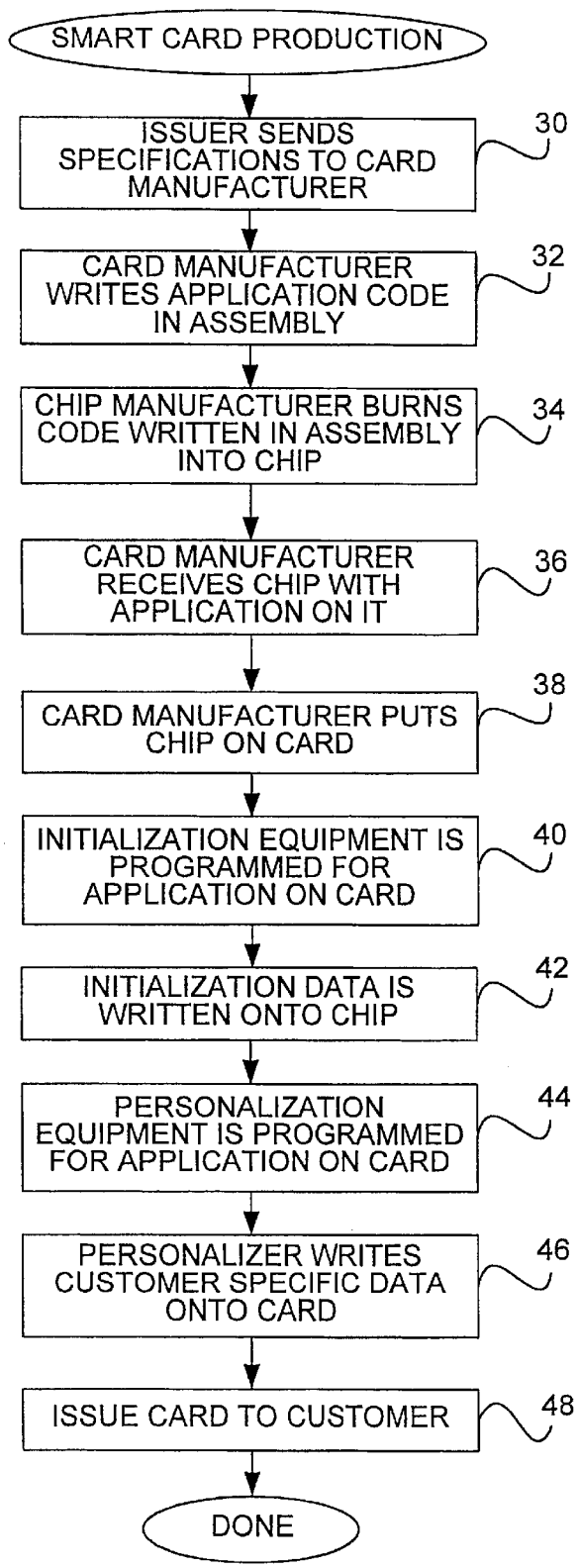
FIG. 1 is a flowchart describing a prior art method for manufacturing a conventional smart card.
Figure 2:
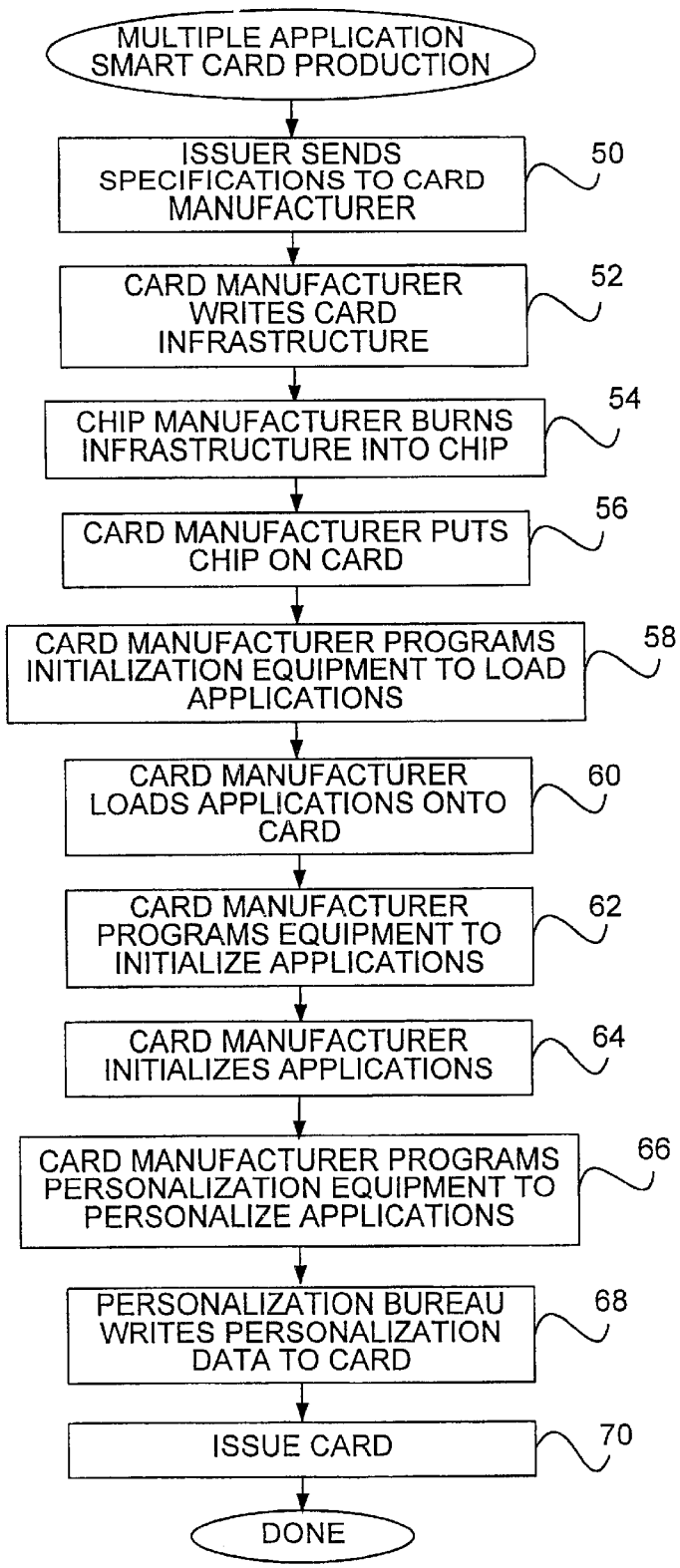
FIG. 2 is a flowchart describing a method for manufacturing a multiple application smart card using a traditional method for manufacturing smart cards.

The present invention is applicable to both traditional, single-application smart cards, and to multi-application smart cards. FIGS. 1 and 2 present previous methods used for producing a single-application smart card and a multi-application smart card. FIG. 1 shows an example where the application code is "burned" into the chip's ROM. FIG. 2 shows an example where the application code is loaded into the chip's non-volatile memory.

Prior Art Smart Card Production

FIG. 1 is a flowchart of a prior art method for manufacturing a smart card. An issuer sends smart card application specifications to a card manufacturer (step 30); the card manufacturer then writes application code, typically in assembly language (step 32). The application code is then sent to a chip manufacturer who burns code written in assembly language into memory areas on a chip (step 34). The chip manufacturer then sends the masked chip back to the card manufacturer who receives the chip with the application on it (step 36). The card manufacturer then embeds or encapsulates the chip onto a plastic card (step 38).

Initialization equipment is then programmed to initialize the specific application which has been installed on the card (step 40). Initialization data is then written onto the chip, typically by the card manufacturer (step 42). Personalization equipment is then programmed to personalize the specific application which has been installed and initialized on the card (step 44). It is common to send the card to a personalization bureau to personalize the card. The personalization bureau writes personalization information onto the card, such as customer specific data provided by the card issuer in pre-processed personalization data files (step 46). Also during personalization, derived or unique keys (per card) may be placed onto the initialized card. Derived or unique per card keys are typically used for application and security purposes. Finally, after the chip has been installed and the card initialized and personalized, it is delivered to the issuer and the smart card is issued to a customer (step 48).

FIG. 2 is a flowchart of an example of how a multi-application smart card might be manufactured using a prior art method. The already complicated process of manufacturing traditional, or single-application smart cards becomes even more difficult with the introduction of multi-application cards that may contain various applications loaded at various stages of the card life. These applications might be written and "owned" or supported by various application providers.

Traditional methods of preparing and issuing smart cards are not practical in a multi-application card environment. Traditional methods require that hardware used to initialize and personalize cards be re-programmed for each new combination of chip and applications; furthermore, there are no provisions for loading applications onto the card after manufacture. The production of cards with multiple applications is extremely complex and not often attempted.

In the method shown in FIG. 2, an issuer sends card specifications to a card manufacturer (step 50). The card manufacturer then writes a card infrastructure based on the card specifications (step 52). A chip manufacturer then burns the infrastructure onto a chip (step 54). The card manufacturer then puts the chip onto a card, providing a card with the required infrastructure to support the different card applications (step 56). The card manufacturer then programs initialization equipment to load different applications onto the card (step 58).

The card manufacturer then runs the initialization equipment to load applications onto the card (step 60). The card manufacturer also programs equipment to initialize these applications (step 62). Using this equipment, the card manufacturer initializes the applications on the card (step 64). The card manufacturer (or more likely, a card personalization bureau) programs personalization equipment to personalize these applications (step 66). The issuer prepares the personalization data files containing its customer-specific data. A personalization bureau (or card manufacturer) then writes this personalization data onto the card (step 68). The card is then ready to be issued (step 70).

Thus, conventional methods require multiple steps at multiple locations, and leave the card issuer (or application provider) dependant upon the card manufacturer and personalization bureau. Additionally, the personalization step of the conventional method is extremely expensive and time consuming. Since virtually all of the equipment involved in initialization and personalization are pre-programmed, each time that there is a change in the specifications or a change in the manufacturer of the card, the software for the various pieces of manufacturing equipment must be rewritten. These limitations make it difficult to issue smart cards, and even more difficult to issue and update multiple application cards. Accordingly, it is currently impractical to mass produce smart cards which are customized for each issuer or application provider. As previously discussed, it is even more difficult to attempt to mass produce custom multi-application smart cards for an issuer, an application provider, or for a customer. To further complicate the matter, multiple application cards generally cannot be updated post-issuance. Current methods do not readily support the manufacture and issuance of these types of cards as has been described.

Smart Card Creation System

Figure 3:
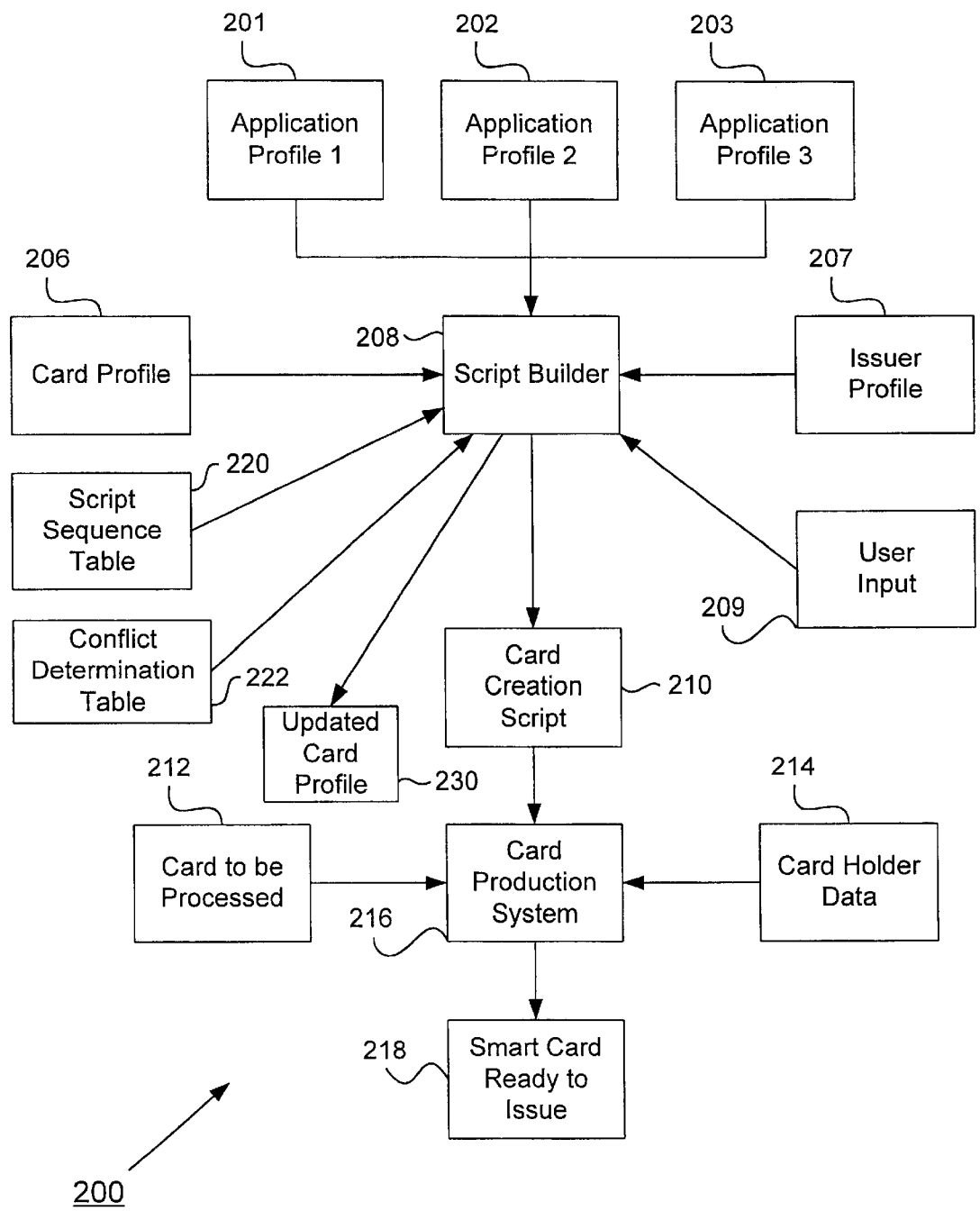
FIG. 3 is a block diagram of a system for manufacturing a smart card according to an embodiment of the present invention.

FIG. 3 is a block diagram of a system 200 for manufacturing a smart card according to one embodiment of the present invention. Application profiles 201–203 are input to a script builder 208. Script builder 208 determines if there are any conflicts between any of the application profiles 201–203. A card profile 206, an issuer profile 207, user input 209, a script sequencing table 220 and a conflict determination table 222 are also input to script builder 208. The aggregated data derived in script builder 208 is then included in a card creation script 210. Further details of script builder 208 will be discussed later in conjunction with FIGS. 4–7. As an option, in a further embodiment, an updated card profile 230 is produced as explained in more detail in FIG. 12.

An application profile is preferably produced by the developer of the application and may be in any suitable format and language. In the specific embodiment described herein, an application profile uses the script language syntax rules such as are shown in the Appendix. For applications written in assembly language (or other suitable language) by the chip or card manufacturer (native applications), the manufacturer may produce the application profile. Each application profile 201–203 includes a variety of elements defining an application: application name, description of application, reference to the application code or the actual code, card hardware requirements (such as memory requirements and processing requirements), software version requirements, card domain and security domain requirements (for Open Platform compliant applications), security requirements, data dictionary, data mapping information, physical characteristics, application life cycle requirements, and default data values. Examples of elements defining an application's memory requirements include an identification of the size of electrically-erasable programmable read-only memory (EEPROM) and random access memory (RAM). Examples of elements defining an application's processing requirements include an identification of CPU and chip core requirements, and any cryptographic requirements.

Examples of elements defining an application's software version requirements include an identification of the version of any software needed on the card by the application, such as the required version of the JavaCard™ virtual machine (JCVM). Domain requirements of the application may be stated for Open Platform smart cards as part of application profiles 201–203. Domain requirements include card domain requirements and security domain requirements. Card domain requirements of the application include an identification of the particular card domain and version needed. Security domain requirements of the application include an identification of the particular security domain and version needed.

Examples of security requirements of the application include initialization and personalization keys, data identifying a cryptographic algorithm, a cryptographic key characterization, versions of keys, etc. Security requirements may vary from one application life cycle state to another. Application profiles 201–203 may include requirements for each life cycle state or only a portion of them. Each profile 201–203 may also include a data dictionary listing and describing all of the card data elements relevant to each application.

Each application profile may also include data mapping information. This information either provides the data elements needed by an application (perhaps by using a default value), supplies user prompt information so that a data element may be entered by a user interactively, or provides a reference to where the data element can be found. Data mapping information associates data elements needed by an application with a particular location on the smart card, for example, some data elements may be mapped to a file on the card or to a data object. In one embodiment of the invention, each application has its own data element table describing how to acquire data unique to the application. Examples of this data include account number, cardholder's name, number of times a personal identification number (PIN) may be input incorrectly before the account is blocked, the currency in which the smart card is to operate, etc. For cards having a file structure, the data element table may contain a reference indicating where each data element is found in a file. The table may also provide default values, user prompts, and/or the name of a data object that provides a value for a data element.

Application profiles 201–203 may also include elements defining physical characteristics of each card that an application may require. Examples of physical characteristics are the graphics, hologram, embossing, and magnetic stripe of the smart card. Additionally, each application has a life cycle which begins at loading of an application and ends with either blocking or expiration. Each application life cycle state may have its own requirements regarding handling and management by smart card production systems. The application profile provides the life cycle states for each application and indicates in which state the application will be in upon card creation.

There is generally only one card profile 206 per card mask. Examples of information which may be included in card profile 206 include: a central processing unit (CPU) model identifier, a crypto-processor identifier (if any), the size or amount of available memory, software version numbers, security requirements for the card and security domains (if applicable), identification of the application (if any) already loaded on the card (e.g., in ROM), physical characteristics of the card, and application life cycle information for applications pre-installed by the card manufacturer in memory (life cycle states, current state). The CPU model identifier is used to identify the manufacturer and model of the smart card chip. The crypto-processor identifier identifies the cryptographic co-processor which is used on the smart card for cryptographic functions. The identification of available memory identifies the type of memory available such as RAM or EEPROM.

Examples of software version numbers include version numbers for different components of the card, such as the operating system, a card executive (if any), and the JCVM (if present). Examples of information identifying security requirements include data identifying the card domain and security domains, and information on the cryptographic keys they have (e.g., key characteristics, version, cryptographic algorithm, etc.). Identification of the application provides the name and version number of any application already present in the card. Examples of physical characteristics include graphics, embossing, and magnetic stripe information. Application life cycle state information for applications already loaded into either ROM or EEPROM of the card may vary from the "loaded" state to the "initialized," "personalized," "blocked" or "deleted" states.

Issuer profile 207 is typically a computer file that includes card common data, i.e., data which is common to a set of cards to be manufactured. Common data includes: the issuer identifier (e.g., BIN), number of security domains to create, level of security requirements to apply during initialization and personalization, etc.

Script builder 208 then produces a card creation script 210 using the information from application profiles 201–203, card profile 206, issuer profile 207 and user input 209 (if needed). Script builder 208 may be implemented in any suitable software tool. User input may include two types of data: card common data and card unique data. Card common data is data that is the same for every card in the personalization batch. Card unique data is different for each card. The user may enter actual data, a reference to another data element, a reference to a location on the smart card, or a reference to a field in the issuer personalization file, a database or another source.

Card creation script 210 describes processes and data required to create a smart card from blank plastic and/or from an uninitialized chip. Card creation script 210 is divided into sections to describe physical and logical attributes of the smart card. It may also contain a combined data element table that maps required data elements from each application to fields in the issuer personalization file, a database, other source, and/or provide default values. The data elements may also be mapped to other sources such as locations on the smart card, or the user may be prompted for information.

Figure 5:
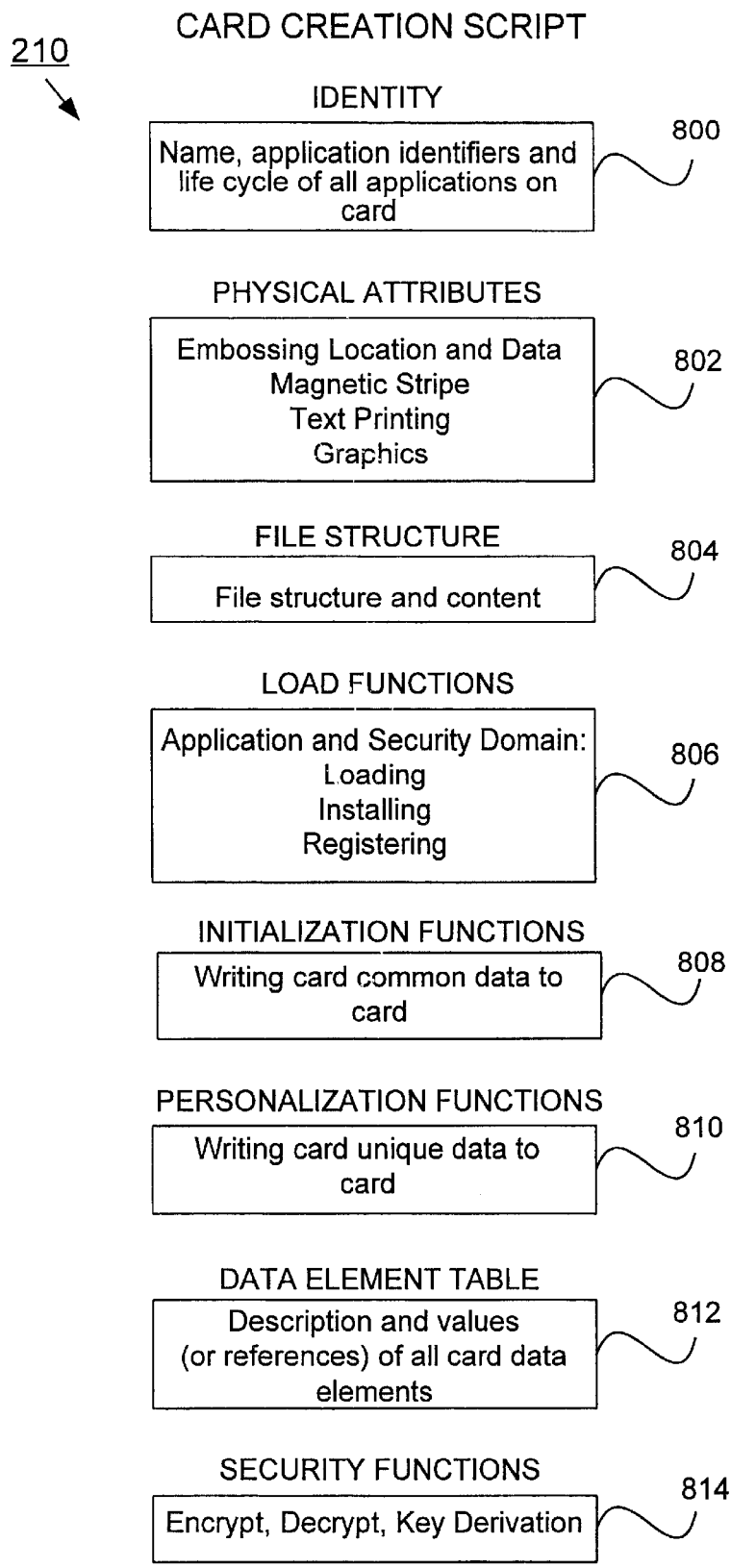
FIG. 5 is an illustration of an example of sections within a script according to an embodiment of the present invention.

In general, card creation script 210 may also include default data values or have references to the cardholder data 214 (i.e., pointers to the location of the cardholder data) within the cardholder information files provided by the card issuer or application provider. Examples of cardholder data include cardholder name and cardholder personal identification number (PIN). Further details on the operation of script builder 208 is described in FIGS. 6 and 7. An example of a card creation script 210 is shown in FIGS. 5 and 10.

Card creation script 210 is then used in a card production system 216. Card production system 216 combines card creation script 210 with a card 212 to be processed and cardholder data 214. Further details of smart card production will be discussed in conjunction with FIGS. 8 and 9. Card production system 216 then results in a smart card 218 ready to be issued.

Building a Card Creation Script

Figure 4:
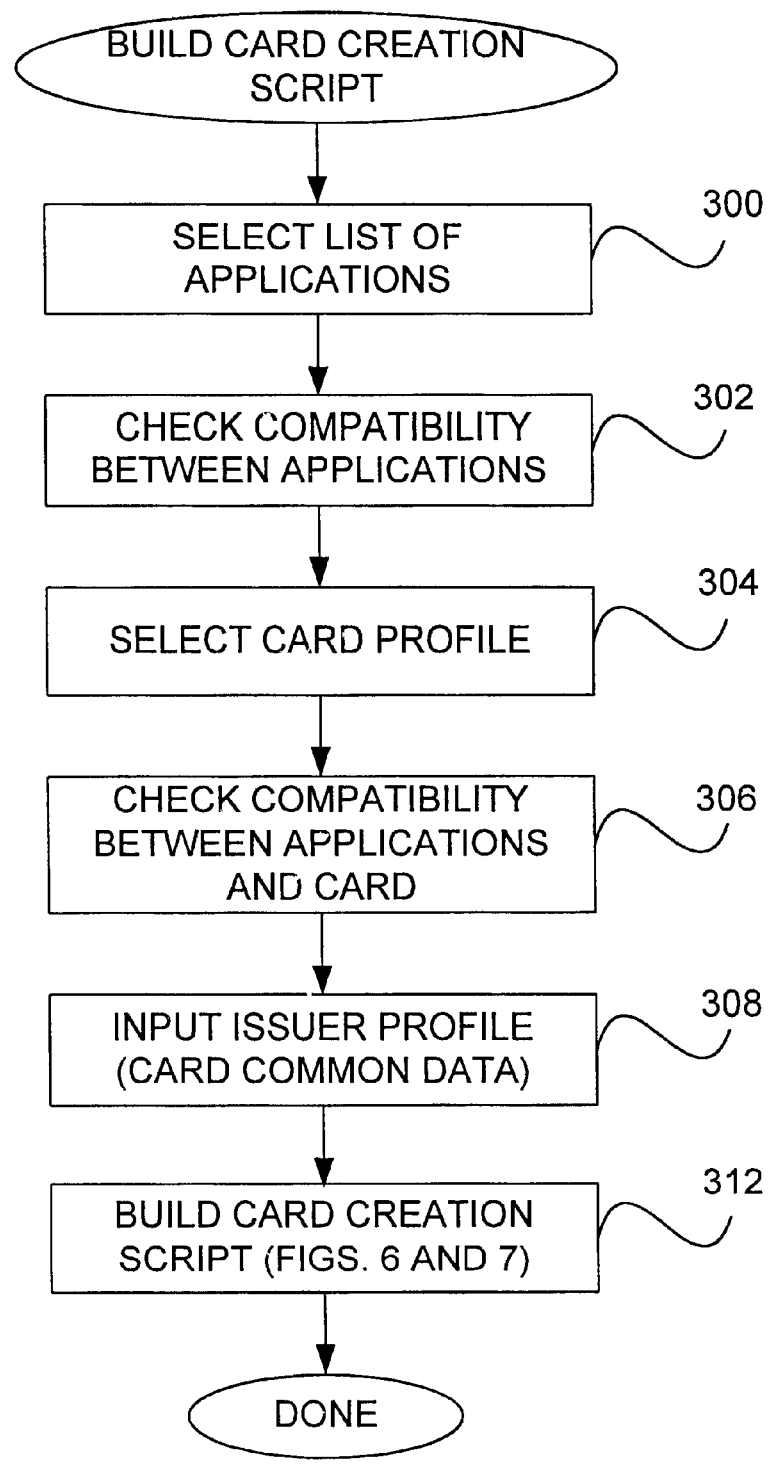
FIG. 4 is a high level flowchart describing a method for building a card creation script.

FIG. 4 is a high level flowchart for building a card creation script 210 for use in manufacturing a smart card according to one embodiment of the present invention. A list of available applications is initially selected (step 300). For each application selected, an application profile is created including the information discussed above. These profiles are then selected to represent the applications to be installed on the smart card. For example, application profiles 201–203 of FIG. 3 may be selected first. Compatibility between the selected applications is then checked (step 302). If any of the applications are incompatible with each other, then a new application may be selected, a new version of the incompatible application may be selected, or an incompatible application may be omitted.

A card profile is also selected (step 304). For the purpose of this disclosure, an embodiment where applications are selected first is shown. Those skilled in the art, upon reading this disclosure will recognize that embodiments of the invention may be implemented by selecting a card profile before selecting application profiles. Compatibility between the selected applications and the smart card described by the card profile is then checked (step 306). If an application and card profile are not compatible, then a new application or a new version of the application may be selected. Alternatively, the incompatible application may be omitted, a new card profile may be selected, or the card profile may be modified. Compatibility between selected applications and the smart card is checked by reviewing requirements of each application. Examples of conflicts include: EEPROM or RAM capacity may be inadequate for certain applications, the CPU may not satisfy an application, a security domain required for personalization is not included, etc.

Issuer profile data is also used in the process of building a card creation script 210 (step 308). An issuer profile includes card common data (data which is common to a set of cards to be manufactured) such as the name and address of the issuer. Preferably, cardholder data 214 is input to card production system 216 during the creation of a card. Cardholder data may include data specific to the cardholder, such as the cardholder's name, credit limit, airline seat preference, etc. It is contemplated, however, that cardholder data 214 may be selected during building of the card creation script and become a part of the script. In another embodiment, references to cardholder data are provided in this step, while the actual data is retrieved while using card production system 216.

A card creation script is then built using the information selected in steps 300–310 (step 312). In general, any number of application profiles may be combined with a card profile and user input to produce a card creation script. The script is then issued for each card product desired to be created. Details of the content of sections of the card creation script will be described below in conjunction with FIGS. 5 and 10. Further details of building the card creation script will be described below in conjunction with FIGS. 6 and 7. A smart card may then be produced using the completed script as will be discussed in conjunction with FIGS. 8 and 9.

FIG. 5 is an illustration of an exemplary block diagram of a card creation script according to an embodiment of the present invention. In general, a script may be written in any suitable card creation language and syntax. One exemplary script using a particular set of syntax rules is shown in the Appendix. The script itself describes the functions and data required to create a smart card from generic white plastic. It provides functions and data to load, install and register desired applications; it also is able to initialize applications with default data values supplied by a user, and to personalize a card with cardholder and application specific data. In one embodiment of the invention, the script is divided into sections that describe physical and logical attributes of the smart card, and contains a data element table that maps the data elements required by each application to locations in the card file structure. The Appendix presents one possible implementation of a simple card creation script that uses particular syntax rules. Of course, a script may be implemented using any suitable set of syntax rules.

The script is shown to include various sections, including sections for: identity 800, physical attributes 802, file structure 804, load functions 806, initialization functions 808, personalization functions 810, data element table 812, and security functions 814. Identity section 800 may include the name, application identifiers, and life cycle descriptions of all applications on the card, including the security domains. Also included may be a mask identification number, a card architecture identifier (traditional or multi-application), the life cycle status for each application upon completion of the creation of the card, etc.

Physical attributes 802 may include location information and data for: bar code, embossing, magnetic stripe, text printing (front and back), hologram and graphics. Also included may be an indication of the I/O type of the card, e.g., contact or contactless. File structure 804 may include file structures of all of the applications and their data contents. Their may be a file structure for each application or one combined file structure representing all applications.

Load functions 806 may include the functions of loading, installing, and registering needed by the applications and security domains. Initialization functions 808 may include functions for writing card common data to the card and for creating the file structure (if not done yet). Personalization functions 810 include functions for writing card unique data to the smart card. Data element table 812 contents include description and values (or references) of all card and application data elements. Security functions 814 include encrypting, decrypting, and cryptographic key derivation functions for the card and applications, as well as cryptographic keys, if desired. In one embodiment, the personalization equipment produces derived keys for loading onto the card using card unique data such as account number, user data, etc.

Figure 6A:
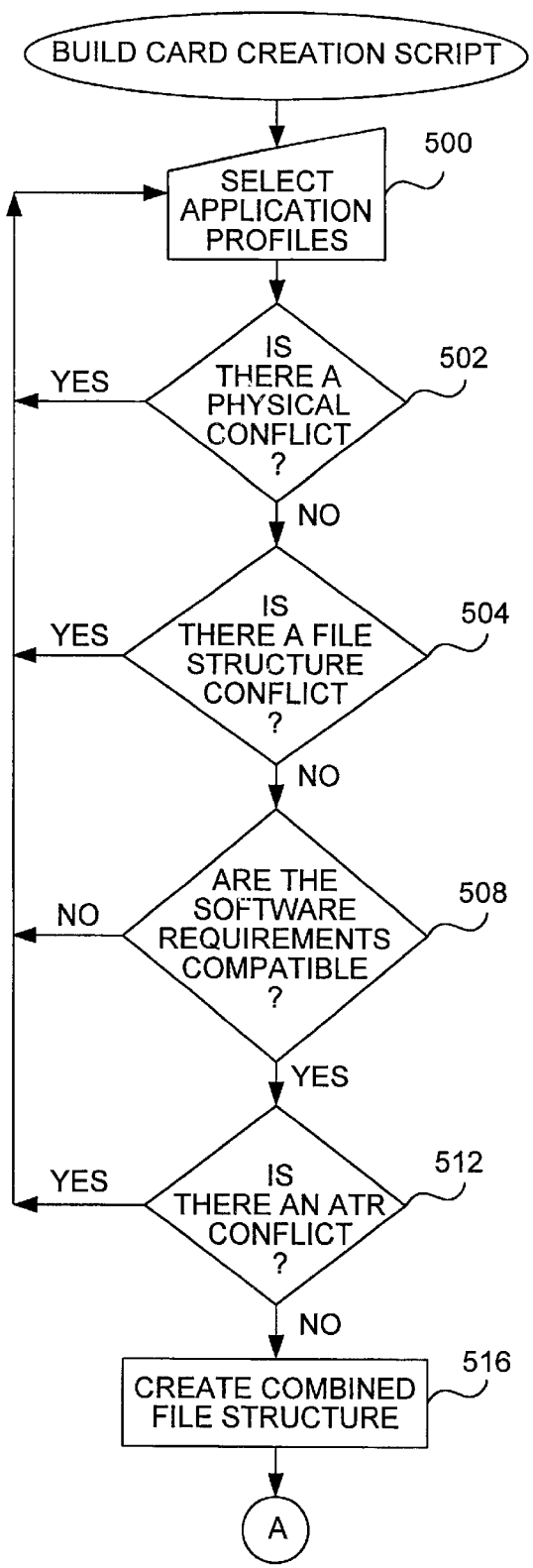
FIGS. 6A–6C are a detailed flowchart describing a method for building a script for a traditional smart card.
Figure 6B:
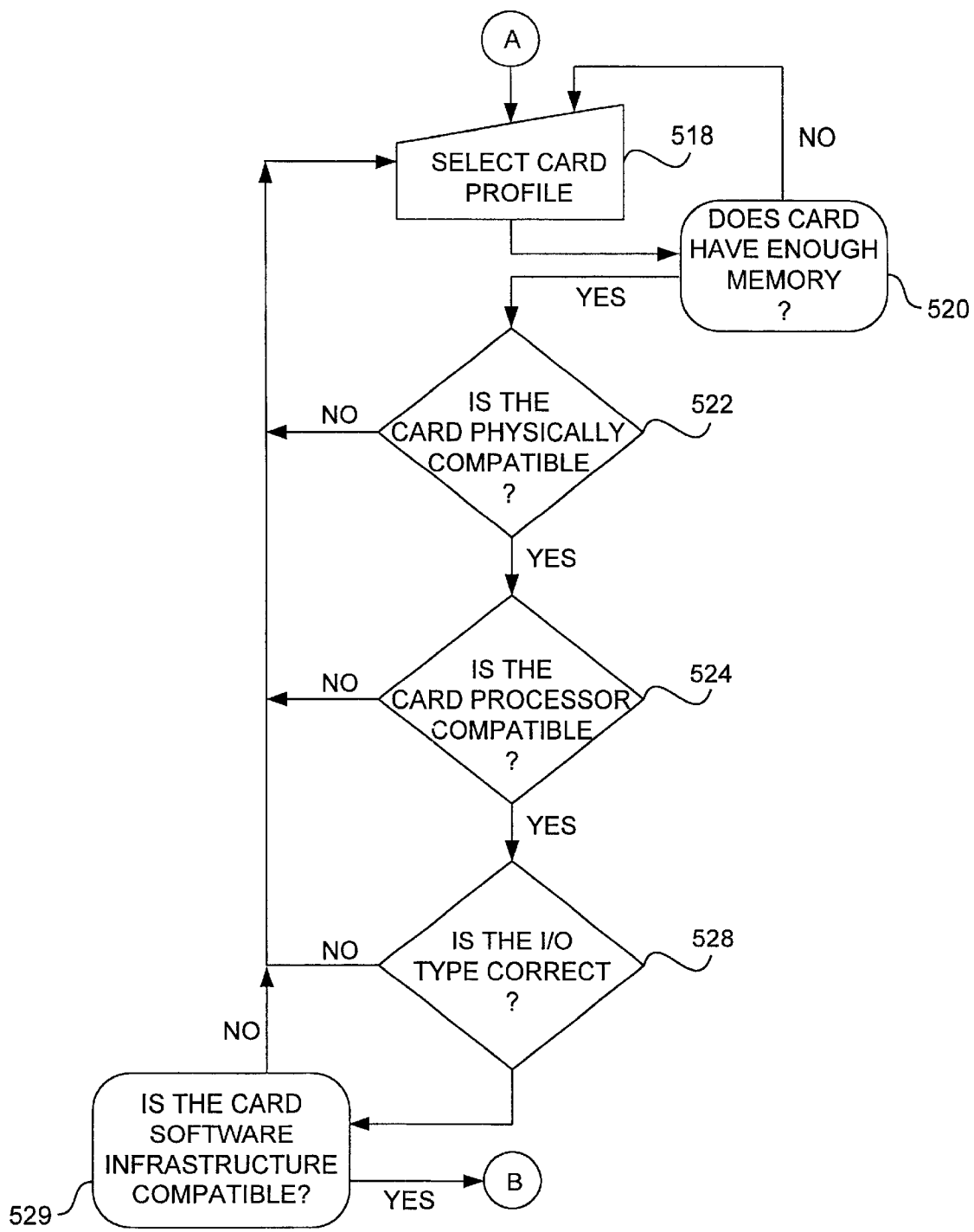
Figure 6C:
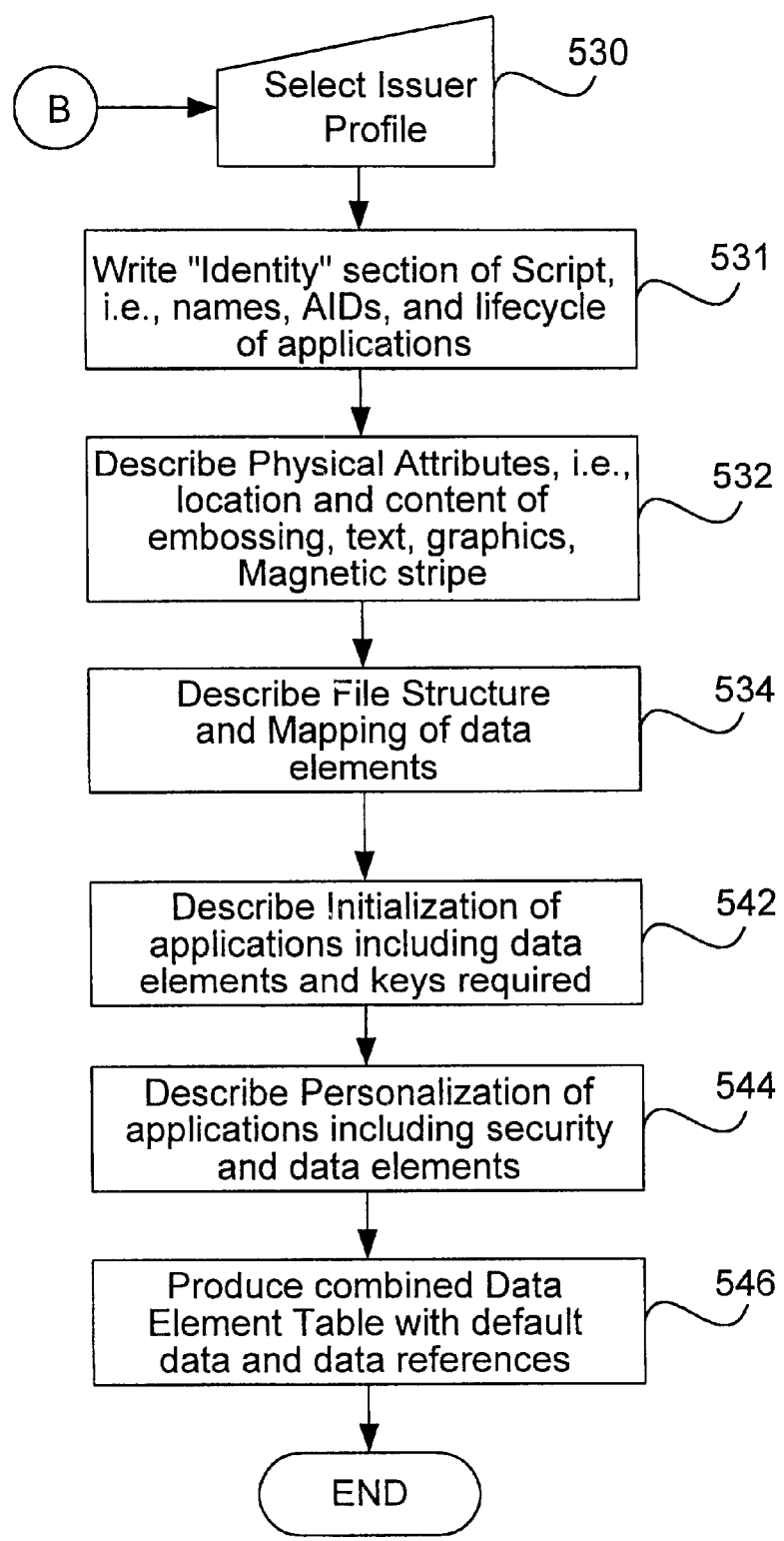

FIGS. 6A–6C are a flowchart for building a card creation script 210 for a traditional or multi-application smart card according to one embodiment of the present invention. This process may be implemented upon any suitable computer and in any suitable computer language. In one embodiment, this process is implemented in the C++ programming language. In general, the process merges the suite of application profiles and the card profile and evaluates them for compatibility. Additionally, the process uses the application profiles and the card profile to aggregate all required data elements into a combined data element table.

Application profiles are initially selected (step 500), and are evaluated to verify their compatibility with one another. In one embodiment, the process reads a "conflict determination table" that describes the checks to be performed (for both applications and the card). FIG. 11 is one embodiment of a simple conflict determination table 222 that lists various checks to be performed. By way of example, table 222 includes version checks for operating system, JCVM, EMV, etc., and memory checks to ensure the card has enough memory for an application. Of course, more complex tables are possible, and checks to be performed may also be described or listed in other manners. FIGS. 6A–6C show an example of such checks. It is then determined whether there is a physical conflict between the selected application profiles (step 502). An example of a physical conflict would be an application profile which requires printing on a card face which conflicts with the magnetic stripe placement requirement of second application profile. Other conflicts could arise from other physical requirements (e.g., embossing, graphics, contacts, printing, etc.). If there is a physical conflict, then another application profile or a new version of an application is selected, or a physical requirement may be changed (step 500). It is also an option to omit an application which has a physical conflict with other applications. Those skilled in the art will recognize that the process of the present invention may also be used to produce single application cards. In the event that single application cards are produced, certain comparison and conflict checking steps may not be required.

If there is no physical conflict between the applications (step 502), then it is determined whether there is a file structure conflict (step 504). There may be a file structure conflict when file structures of the selected applications are somehow incompatible with each other. Examples of incompatible file structures include two files having the same identifier or name, an incompatible file hierarchy, or other. Also, it is possible that there may be a conflict within the various application data element tables. For example, there may be a conflict within the file structure such that two applications may attempt to use the same directory and file. If such a conflict is detected, then either a new application profile or a new version of an application profile is selected (step 500).

If there are no file structure conflicts (step 504), the process may then proceed to determine whether software version requirements are compatible between the selected applications and the card (step 508). Examples of incompatible software requirements are: incompatibility between applications for a variety of reasons, incompatible version of the card operating system, and an ATR conflict (see step 512).

If the software requirements are not compatible (step 508), then a new application profile or a new version of an application profile is selected, or other modifications may be made (step 500). As part of determining compatibility of software requirements, the process may determine whether there is a conflict between applications during Attention To Reset (ATR) (step 512). An ATR is typically a smart card's first response when inserted into a terminal. If two selected applications have conflicting response requirements during ATR, then there is a conflict. If there is a conflict during ATR (step 512), then another application profile or another version of a profile is selected, or the conflicting application is omitted (step 500).

If there is no ATR conflict (step 512), then a combined file structure is then created (step 516). The file structures for all of the applications are combined and a single combined file structure is built for the smart card. An example of a combined file structure has an overall file hierarchy starting at the ISO 7816-6 master file as a root and describes hierarchies of directory files and elementary files.

Those skilled in the art will recognize that the sequence and types of comparisons listed here may be modified by changing the sequence or by adjusting comparisons to avoid conflicts. In one specific embodiment, the "conflict determination table" is changed. The steps listed here are simply presented as exemplary, and additional or different comparisons may be performed as needed to avoid application conflicts.

The process continues by selecting a card profile (step 518). As previously discussed, a card profile 206 may include a CPU model identifier, a crypto-processor identifier (if any), available RAM and EEPROM, identification of application (if any) already loaded, physical characteristics of the card, application life cycle information for applications pre-installed by the card manufacturer in ROM or EEPROM, and any other information deemed necessary to define a card profile.

After a card profile is selected (step 518) and the conflict determination table read, it is determined whether the memory available on the card to be processed is adequate for the selected applications (step 520). If the card does not have enough memory, then another card profile or a new version of the card profile is selected (step 518).

If the smart card does have enough memory (step 520), then it is determined whether the smart card to be processed is physically compatible with the selected applications (step 522). For example, it is determined whether the smart card can support the physical requirements for the applications, such as whether the printing on the smart card is compatible with the applications, and whether a magnetic stripe is available for the applications.

If the smart card is not physically compatible with the applications (step 522), a new card profile is selected or a new version of the card profile is selected (step 518). If, however, the card is physically compatible with the applications (step 522), then it is determined whether the card processor is compatible with the selected applications (step 524). The "card processor" to be checked may include a main processor and/or a co-processor. If the card processor is not adequate for the selected applications, then a new card profile or a new version of a card profile is selected (step 518). If, however, the card processor is compatible with the selected applications (step 524), then it is determined whether the input/output (I/O) type used on the smart card is compatible with the selected applications (step 528). Examples of I/O type include contact or contactless cards. If the I/O type is not compatible with the selected application (step 528), then a new card profile or a new version of the card profile is selected (step 518). An example of an incompatible I/O type is a contactless application but contact-only card.

If the I/O type is compatible, the process then proceeds to determine if software requirements of the selected applications are compatible with the card software infrastructure (step 529). An example of incompatible software requirements is a different version of the card operating system than what is needed. Again, the sequence of comparisons and the list of items checked above is intended to be illustrative and may be modified while still achieving objectives of the present invention.

Next, the script is built by writing various sections as will now be described. In one embodiment, the sequence and rules for each of the script sections are governed by a "script sequencing table." FIG. 10 shows one embodiment of a simple script sequencing table 220 that lists the order in which script sections should appear. Of course, more complex tables are possible, and a script may be written to or ordered in many different ways. An issuer profile 207 is then selected (step 530). The issuer profile contains issuer default data such as issuer specific data relating to identification and security. Additionally, certain application default information such as currency and size of the on-card transaction log may also be included in the issuer profile. This information and data may also be referred to as "static" data, and may either be stored in initialization section 808 or in personalization section 810 depending upon the type of information and the application.

Card creation script 210 is formed by first writing the "identity" section 800 (FIG. 5) of the script (step 530). Identity section 800 is written by extracting application identity information from all selected application profiles and card profile, and by combining the information into an identity section of card creation script 210. The resulting identity section 800 of the script may include the name, application identifiers, and life cycle of each application on the smart card. Application identifiers are defined by ISO 7816-5 and are used to uniquely address or select an application on a smart card.

Physical attributes of the smart card are then described in "physical" section 802 (FIG. 5) of the script (step 532). In describing the physical attributes of the smart card, the required physical attributes from the various applications and card profile are combined into this physical section of the script. Examples of physical attributes include location and content of embossing, text, graphics, magnetic stripe and bar code requirements.

The combined card file structure created in step 516 is then described (step 534) in a file structure section 804 (FIG. 5) of the script. The structure is described by listing all files, the file hierarchy, the file types (circular, linear, fixed/variable length), etc. Although in one embodiment load functions are not loaded into section 806 for a single-application card, it is contemplated that load functions are able to be loaded if required.

The initialization of applications is then described (step 542) in an initialization section 808 (FIG. 5) of the script. The description may include data elements, any required cryptographic keys and other card common data. Much of the initialization data may be contained in the issuer profile. The remaining initialization data may be derived from the data element tables from each application profile. Also, certain default data values may be provided through interactive user input.

Personalization of applications is also described (step 544) in a personalization section 810 (FIG. 5) of the script. Personalization data includes security and data elements, and other data that is unique to an individual card. The data element table for each application contains pointers (references to a location) to the cardholder data for each application. This data is preferably located in the issuer personalization file, a database or any other source.

A combined data element table is then produced with default data and data references (step 546). The data element table is then stored in section 812 of the script. In this step, the data element tables for all the applications are combined to produce a single data element table for the card that contains both the actual card common data and the location of data for the card unique data. Also, the individual data elements of the combined data element table are mapped to the combined file structure. Any needed security functions 814 may also be added to the script at this point as well as any cryptographic keys, if desired.

Figure 7A:
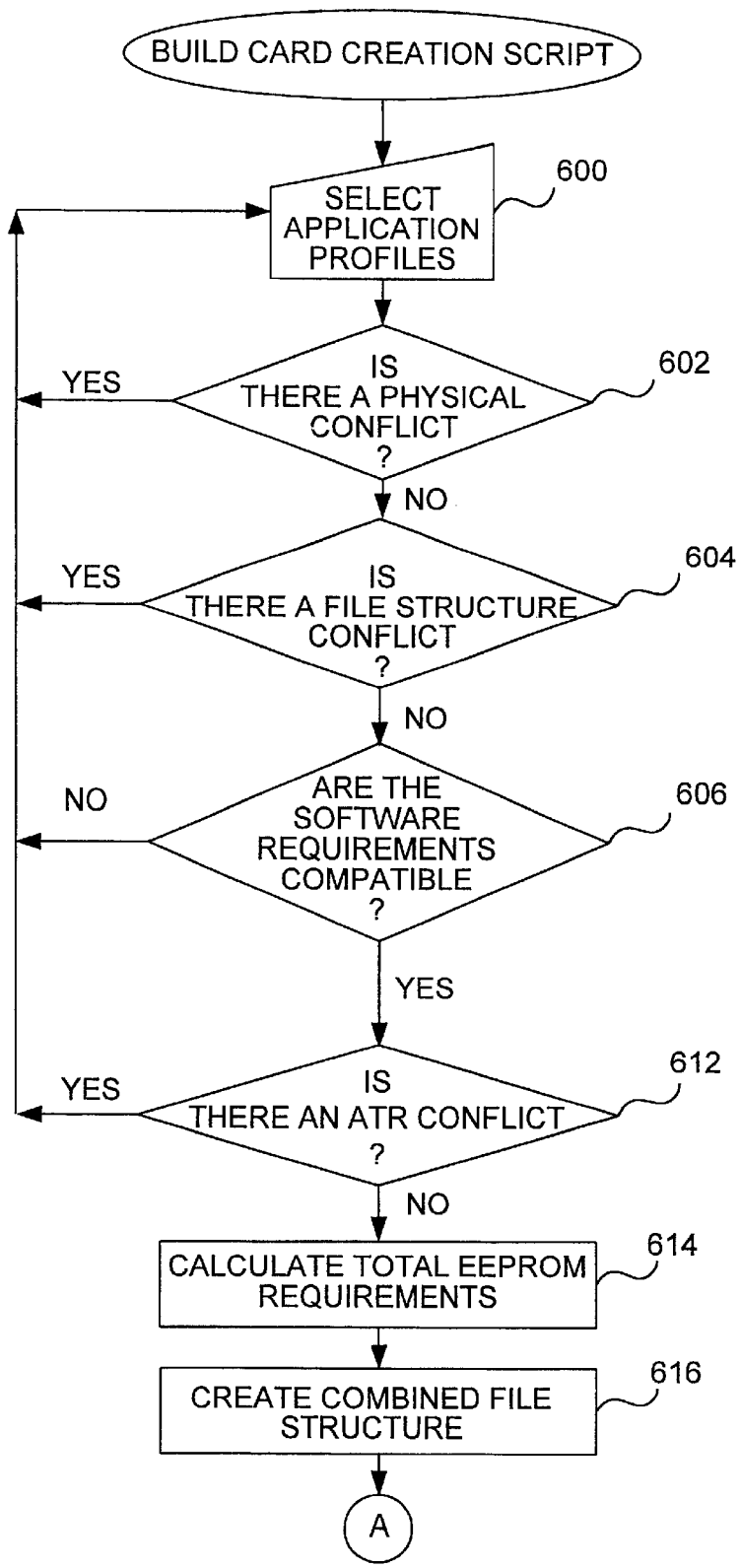
FIGS. 7A–7C are a detailed flowchart describing a method for building a script for a multi-application smart card.
Figure 7B:
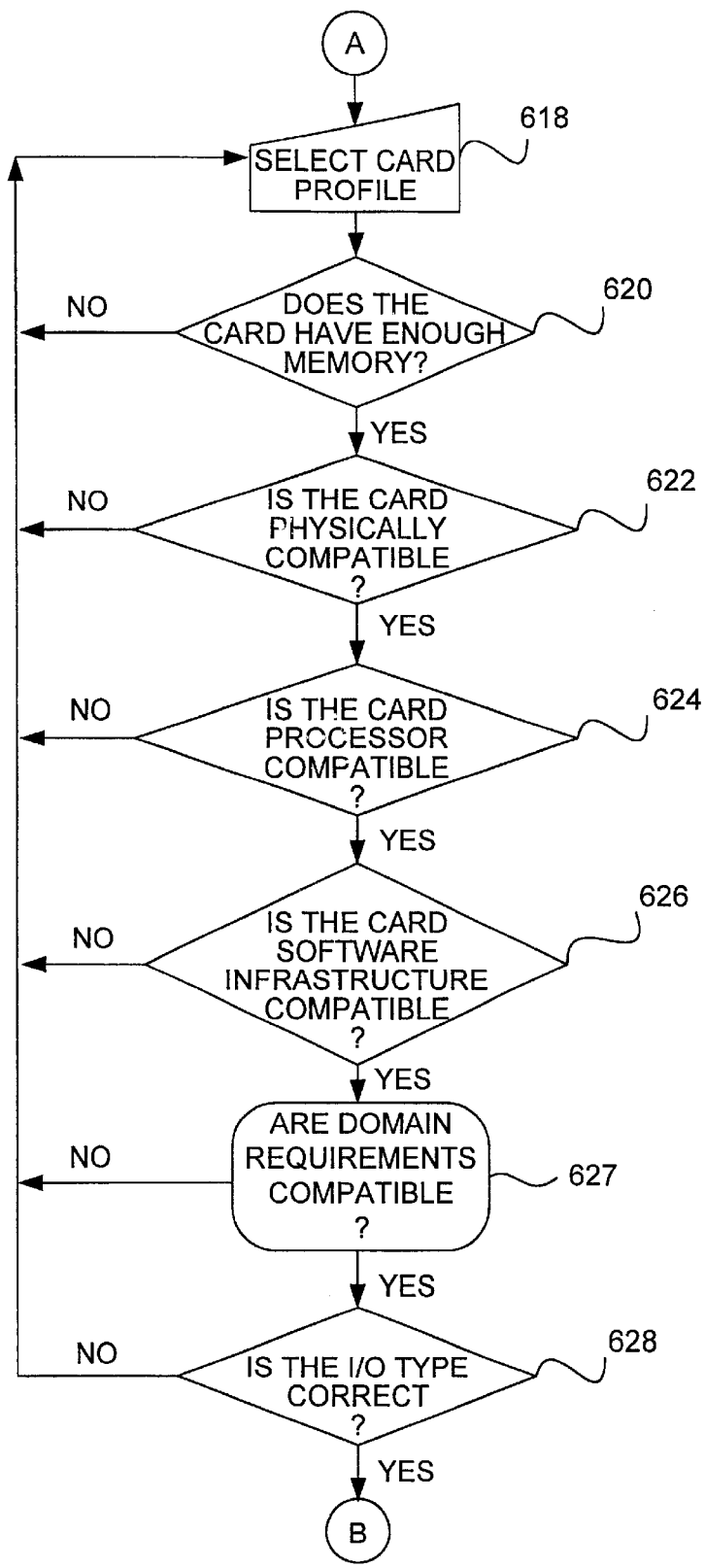
Figure 7C:
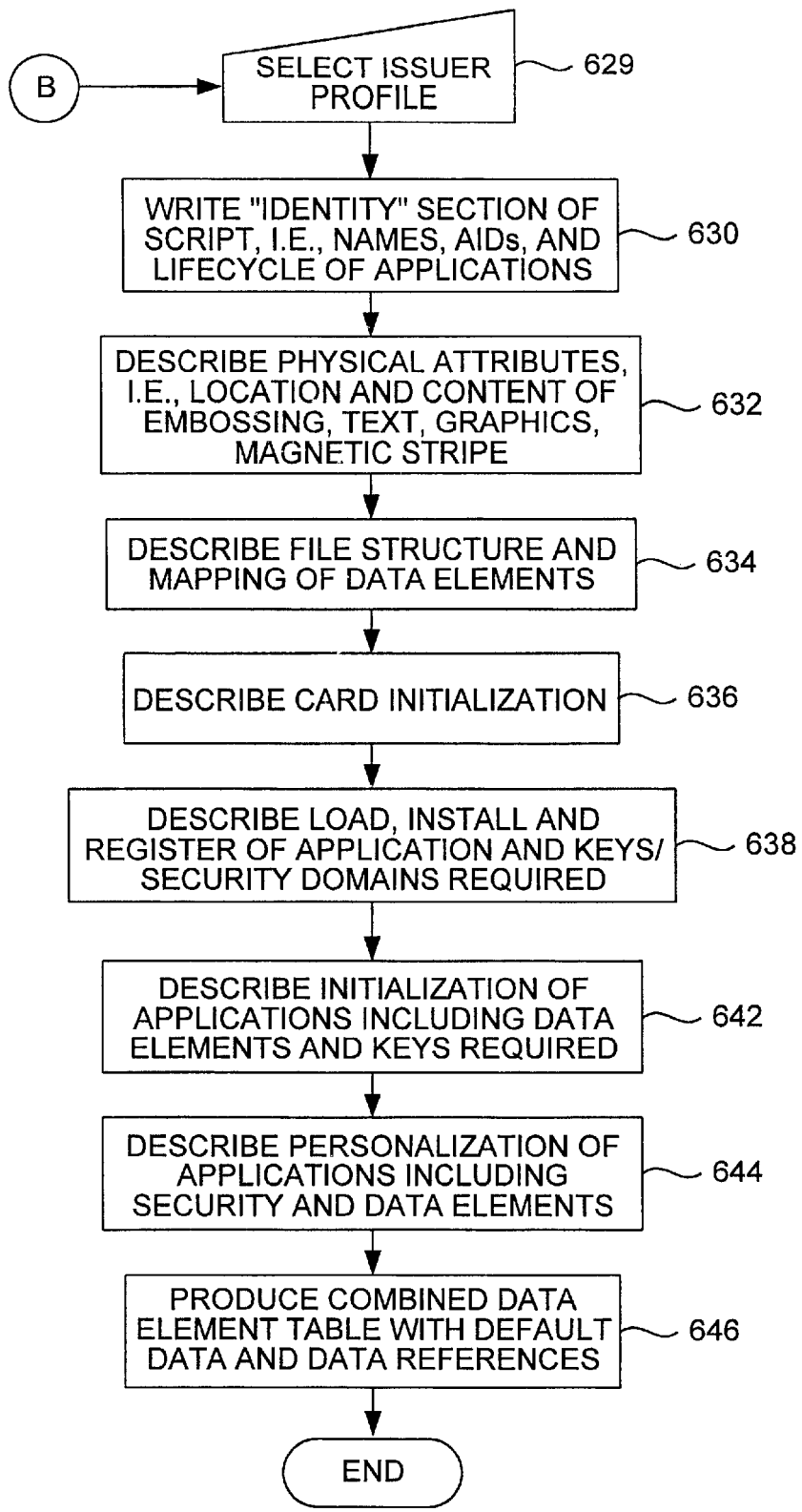

FIGS. 7A–7C are a flowchart for building a card creation script for an Open Platform smart card according to one embodiment of the present invention. This process may be implemented upon any suitable computer and in any suitable computer language. In one embodiment, this process is implemented in the C++ programming language. In general, the process merges a suite of application profiles with the card profile and evaluates them for compatibility. Additionally, the process uses the application profiles and the card profile to aggregate all required data elements into a combined data element table.

Application profiles are initially selected (step 600), and are evaluated to verify their compatibility with one another. In one embodiment, the process reads a "conflict determination table" that describes the checks to be performed (for both applications and the card). Of course, checks to be performed may also be described or listed in other manners. FIGS. 7A–7C show an example of such checks. It is then determined whether there is a physical conflict (step 602). An example of a physical conflict would be an application profile which requires printing on a card face which conflicts with the magnetic stripe placement requirement of second application profile. Other conflicts could arise from other physical requirements (e.g., embossing, graphics, contacts, printing, etc.). If there is a physical conflict, then another application profile or a new version of an application is selected, or a physical requirement may be changed (step 600). It is also an option to omit an application which has a physical conflict with other applications. In the event that single application cards are produced, certain comparison and conflict checking steps may not be required. Also, those skilled in the art will recognize that the sequence of comparisons listed here may be modified by changing the sequence or by adjusting comparisons to avoid conflicts. In one embodiment, the conflict determination table may be changed. The steps listed here are simply presented as exemplary.

If there is no physical conflict between the applications (step 602), then it is determined whether there is a file structure conflict (step 604). There may be a file structure conflict when file structures of the selected applications are somehow incompatible with each other. Potential incompatible file structures have been noted above. If there is a file structure conflict, then the conflicting profile may be omitted or either a new application profile or a new version of an application profile may be selected (step 600).

If there are no file structure conflicts (step 604), the process may then proceed to determine whether software requirements are compatible across the selected applications (step 606). If the software requirements are not compatible, then the conflicting application may be omitted or another application profile or a new version of an application profile may be selected (step 600). Examples of incompatible software requirements include: incompatible version of the JavaCard ™ virtual machine (JCVM), ATR conflicts, etc.

For example, the process determines whether there is a conflict between applications during the Attention To Reset (ATR) (step 612). An ATR is a smart card's first response when inserted into a terminal. If two selected applications have conflicting response requirements during ATR, then there is a conflict. If there is a conflict during ATR (step 612), then a conflicting application may be omitted or another application profile or another version of a profile may be selected (step 600).

If there is no ATR conflict (step 612), then total EEPROM requirements are calculated (step 614). In calculating total EEPROM requirements, the total memory (EEPROM) requirements are added up for all of the applications. A combined file structure is then created (step 616) in which the file structures for all of the applications are combined and a single file structure is built for the smart card. A combined file structure is described above in step 516.

Next, a card profile is selected (step 618). As previously discussed, a card profile 206 may include a CPU model identifier, a crypto-processor identifier (if any), available RAM, EEPROM, card executive, and JCVM version numbers, security requirements (card and security domains), identification of application (if any) already loaded, physical characteristics of the card, application life cycle information for applications pre-installed by the card manufacturer in ROM or EEPROM, and any other information deemed necessary to define a card profile.

After a card profile is selected (step 618) and the conflict determination table read, it is determined whether the memory available on the card to be processed is adequate for the selected applications (step 620). If the card does not have enough memory (step 620), then another card profile or a new version of the card profile is selected (step 618).

If the smart card does have enough memory (step 620), then it is determined whether the smart card is physically compatible with the selected applications (step 622). For example, it is determined whether the smart card can support the physical requirements for the applications, such as whether the printing on the smart card is compatible with the applications, and whether a magnetic stripe is available for the applications.

If the smart card is not physically compatible with the applications (step 622), a new card profile is selected or a new version of the card profile is selected (step 618). If, however, the card is physically compatible with the applications (step 622), then it is determined whether the card processor is compatible with the selected applications (step 624). The "card processor" to be checked may include a main processor and/or a co-processor. If the card processor is not adequate for the selected applications, then a new card profile or a new version of a card profile is selected (step 618). If, however, the card processor is compatible with the selected applications (step 624), then it is determined whether the software infrastructure is compatible with the selected applications (step 626). If the card software infrastructure is not compatible with the applications, then a new card profile or a new version of the card profile is selected (step 618). Determining whether the software infrastructure is compatible includes determining whether the JavaCard™ virtual machine (JCVM) is compatible with the applications.

If the card software infrastructure is compatible with the applications (step 626), then it is determined whether domain requirements are compatible (step 627). Checking the compatibility between domain requirements include determining whether a card domain and security domains in the Open Platform smart card are compatible. If domain requirements are not compatible (step 610), then a conflicting application may be omitted or another application profile or a new version of an application profile may be selected (step 600). Determining whether the card domain and security domains are compatible with a security domain involves verifying that a specific security domain required by a selected application is either already loaded on the card or selected to be loaded.

If domain requirements are compatible (step 610), then it is determined whether the input/output (I/O) type used on the smart card is compatible with the selected applications (step 628). Examples of I/O type include contact or contactless cards. If the I/O type is not compatible with the selected application (step 628), then a new card profile or a new version of the card profile is selected (step 618). An example of an incompatible I/O type is a contactless application but contact-only card.

Next, the script is built by writing various sections as will now be described. In one embodiment, the sequence and rules for each of the script sections are governed by a "script sequencing table." FIG. 10 shows one embodiment of a simple script sequencing table 220 that lists the order in which script sections should appear. Of course, more complex tables are possible, and a script may be written to or ordered in many different ways. An issuer profile 207 is then selected (step 640). The issuer profile contains issuer default data such as issuer specific data relating to identification and security. Additionally, certain application default information such as currency and size of the on-card transaction log may also be included in the issuer profile. This information and data may also be referred to as "static" data, and may either be stored in initialization section 808 or in personalization section 810 depending upon the type of information and the application.

A card creation script 210 is formed by first writing the "identity" section 800 of the script (step 630). The identity section is written by extracting application identity information from all selected application profiles and card profile and by combining the information into an identity section of the card creation script. As previously mentioned, the resulting identity section of the script may include the name, application identifiers, and life cycle of all applications on the smart card.

Physical attributes of the smart card are then described in a "physical" section 802 of the script (step 632). In describing the physical attributes of the smart card, the required physical attributes from the various application and card profiles are combined into this physical section of the script which describes physical attributes. Examples of physical attributes include location and content of embossing, text, graphics, and magnetic stripe requirements.

The combined card file structure created in step 616 is then described in a file structure section 804 of the script (step 634). The structure is described by listing all files, the file hierarchy, the file types (circular, linear, fixed/variable length), etc.

A card initialization process and installation of domains are described next (step 636). For Open Platform smart cards, a process registers the card domain with the card executive and installs any security domains and applications that are already loaded in the card. This process and information is preferably stored in initialization section 808.

Load, install, and register commands of certain applications are described along with a description of keys and security domains which are required (step 638). For example, Open Platform smart card applications written in JAVA need to be loaded into memory, run an install process, and register with a security domain in order to be able to load its application keys at a later stage (step 642). Preferably, these commands are stored in load section 806.

The initialization of applications is then described in an initialization section 808 of the script (step 642). The description may include data elements, any required cryptographic keys and other card common data. Much of the initialization data may be contained in the issuer profile. The remaining initialization data may be derived from the data element tables from each application profile. Also, certain default data values may be provided through interactive user input.

Personalization of applications is then described in a personalization section 810 of the script (step 644). Personalization data includes security and data elements, and other data that is unique to an individual card. The data element table for each application contains pointers (references to a location) to the cardholder data for each application. This data is located in the issuer personalization file, a database or any other source.

A combined data element table is produced with default data and data references (step 646). In this step, the data element tables for all the applications are combined to produce a single data element table for the card that contains both the actual card common data and the location of data for the card unique data. Also, the individual data elements of the combined data element table are mapped to the combined file structure. Any needed security functions 814 may also be added to the script at this point as well as any cryptographic keys, if desired.

Figure 8:
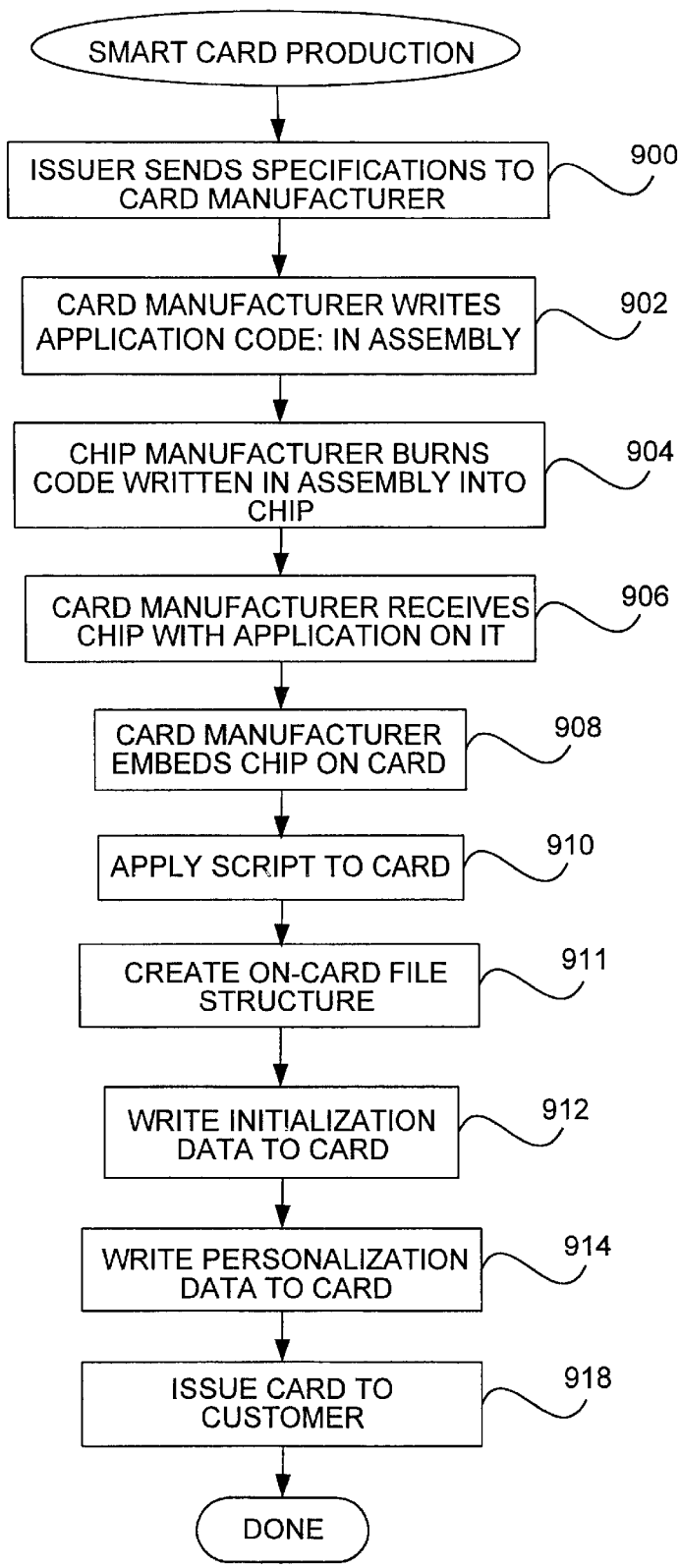
FIG. 8 is a flowchart describing a method for manufacturing a traditional smart card.

FIG. 8 is a flowchart for manufacturing a traditional smart card according to one embodiment of the present invention. An issuer first sends specifications to a card manufacturer (step 900). Next, the card manufacturer writes application code in a computer language, such as in assembly (step 902). A chip manufacturer then burns the code into a chip (step 904). The card manufacturer receives the chip with the application on it (step 906) and embeds the chip on the card, providing a non-personalized card to be processed (step 908).

At some point, the issuer supplies a personalization file containing cardholder data to the card manufacturer. The cardholder data includes an application suite identifier that identifies which applications are to be personalized (i.e., which card product is to be produced). This application suite identifier is used to select the appropriate card creation script from among many. The card creation script is then applied to the non-personalized card (step 910). In one embodiment, personalization equipment (card production hardware and software) receives the card creation script, application source files, cardholder data, and encryption keys (from any suitable hardware security module). The personalization equipment uses the script to personalize a smart card ready to be issued to a cardholder. One of skill in the art may readily write a parser program to process a script and control the personalization equipment.

In particular, the script commands the personalization equipment to create the on-card file structure (step 911), to write initialization data onto the card (step 912), and to write personalization data onto the card (step 914). Personalization data includes cardholder data 214 that is specific to the cardholder, such as the cardholder's name, credit limit, airline seat preference, etc. Cryptographic keys may also be loaded onto the card during the initialization and personalization steps. Thereafter, the smart card may be issued to a customer (step 918).

Figure 9:
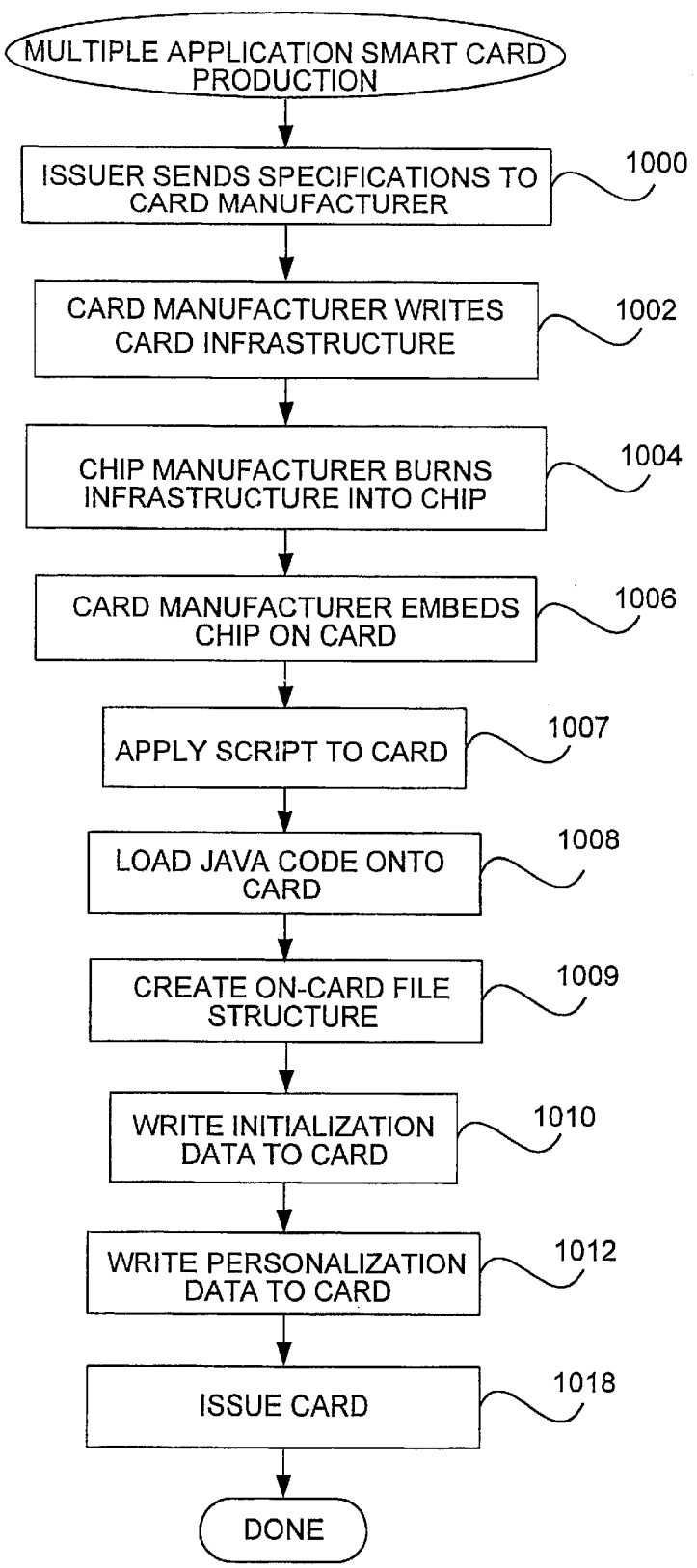
FIG. 9 is a flowchart describing a method for manufacturing a multi-application smart card.

FIG. 9 is a flowchart for manufacturing an Open Platform smart card (a multi-application card) according to one embodiment of the present invention. An issuer sends an Open Platform card specification to a card manufacturer (step 1000). The card manufacturer then writes card infrastructure for the Open Platform card (step 1002). A chip manufacturer then burns the infrastructure into a chip (step 1004). The card manufacturer then embeds the chip on the card, producing an Open Platform card with infrastructure (step 1006).

At some point, the issuer supplies a personalization file containing cardholder data to the card manufacturer. The cardholder data includes an application suite identifier that identifies which applications are to be placed onto the card (i.e., which card product is to be produced). This application suite identifier is used to select the appropriate card creation script from among many. The card creation script is then applied to the Open Platform card (step 1007). In one embodiment, personalization equipment (card production hardware and software) receives the card creation script, application source files, cardholder data, and encryption keys (from any suitable hardware security module). The personalization equipment uses the script to personalize a smart card ready to be issued to a cardholder. One of skill in the art may readily write a parser program to process a script and control the personalization equipment.

When the script is applied, application code is loaded onto the card (step 1008), the file structure is created on the card (step 1009), and initialization data is written onto the card (step 1010) as well as personalization data (step 1012). Personalization data includes cardholder data 214 that is specific to the cardholder, such as the cardholder's name, credit limit, airline seat preference, etc. Cryptographic keys may also be loaded onto the card during the initialization and personalization steps. The Open Platform card is then ready to be issued (step 1018).

Post-Insurance Application Loading

In a further embodiment of the invention, the updated card profile 230 of FIG. 3 is useful for loading applications onto a smart card post-issuance. Updated card profile 230 is a "snapshot" of a batch of cards as issued; it is a profile of a particular card product such as an ATM card, a cash card, a stored-value card, a loyalty card, etc. Updated card profile 230 reflects the applications loaded onto a card and the resources remaining on that card. If new applications are desired to be loaded post-issuance, updated card profile 230 can be used to check for conflicts between the existing, issued card and these new applications. In one embodiment, the updated card profile can be fed back into system 200 of FIG. 3 along with profiles of new applications desired to be loaded post-issuance. The system then produces another card creation script suitable for loading the new applications onto the existing cards. Because the updated card profile can be compared to new applications to be loaded, the user receives assurances that the new script produced will load applications that will function properly on the card.

Figure 12:
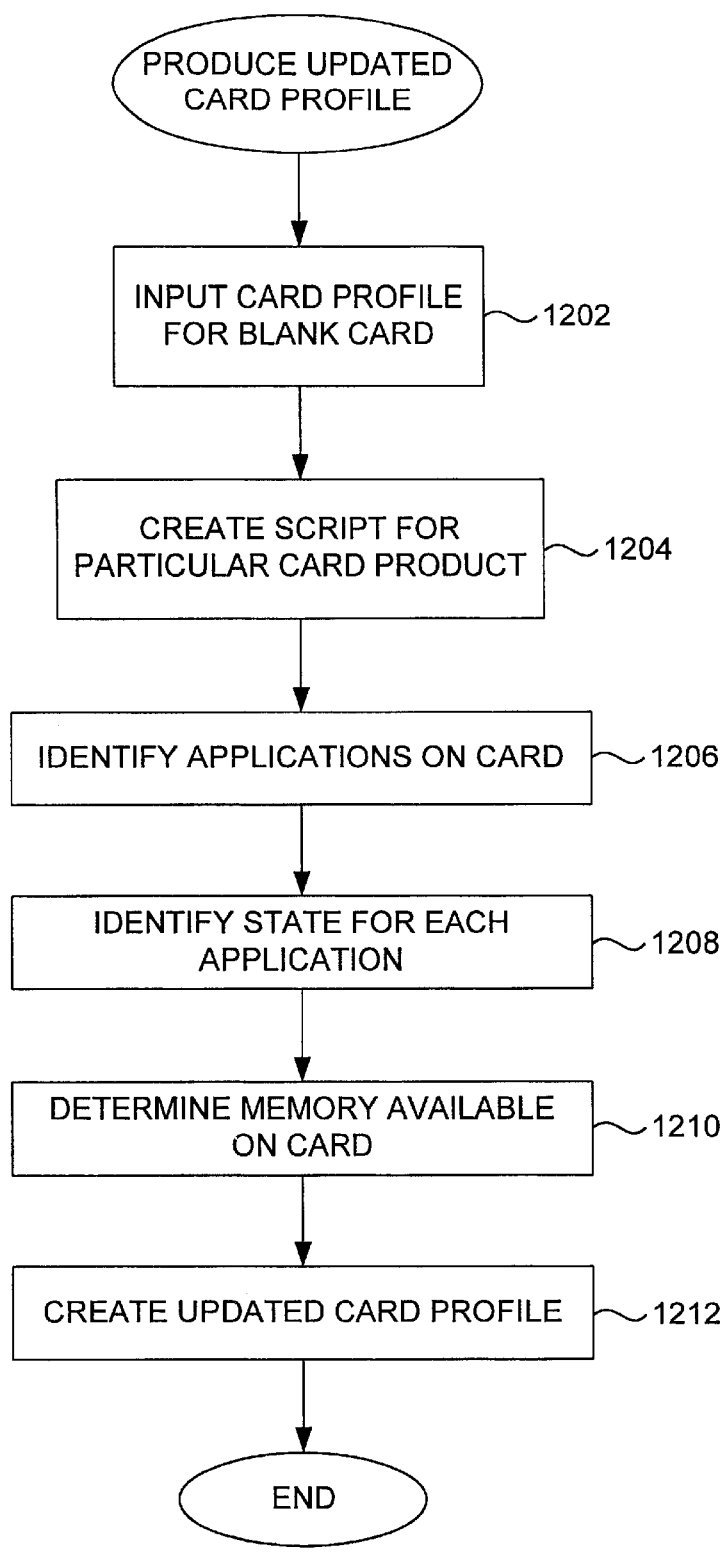
FIG. 12 is a flowchart describing a method for producing an updated card profile according to one embodiment.

FIG. 12 is a flowchart describing a method for producing an updated card profile according to one embodiment. As shown in FIG. 3, updated card profile 230 is an optional output of script builder 208. The user of system 200 may elect to produce profile 230 if an updated profile would prove useful in the future, for example, if applications are desired to be loaded onto cards post-issuance.

Card profile 206 is input to system 200 (step 1202) and represents resources of a blank card as has already been described. A script 210 is then created for a particular card product (step 1204) as has been described in detail in any of the embodiments of FIGS. 3–11. A card product may be any suitable card ready to be issued to a customer or other entity. By way of example, a card product may be any suitable card with a particular application or set of applications, such as an ATM card, a stored-value card, a loyalty card, etc. Next, information is identified in steps 1206–1212 to be used in creating updated card profile 230. Those of skill in the art will appreciate that steps 1206–1212 may occur before step 1204, in conjunction with, or after.

The applications that are to be loaded onto the card using created script 210 are identified (step 1206), including application name, version number, and other identifying characteristics of each application. The applications profiles used to create script 210 may be used to retrieve this identifying information. The life cycle state of each application (step 1208) is then identified. Preferably, the state of each application is the state in which it will exist on the card when issued. The memory available on the card after the applications have been loaded is then determined (step 1210). Memory available may refer to any type of memory on the card that is remaining after a particular set of applications have been loaded. In one embodiment, the EEPROM memory available on the card after any number of applications are loaded is calculated. Card profile 206 and the applications profiles used to create script 210 may be used to calculate available memory.

Finally, the information retrieved in steps 1206–1210 is used to create an updated card profile 230 (step 1212). Updated card profile 230 preferably has the same format as original card profile 206 although it is now updated with the information from steps 1206–1210. Any other information on updated card profile 230 may also be updated as appropriate. For example, if the issuing procedure results in a change to the physical characteristics of a card, the updated card profile may also reflect that change, thus indicating that a particular batch of cards now has a different physical characteristic. Updated card profile 230 is then stored for future use.

In an alternative embodiment, an updated card profile is produced not from the script builder 208 of system 200, but may be manually constructed. In this situation, a user may manually create a file for the updated card profile that contains all profile information for an existing card product. Such an alternative embodiment may be useful in a situation where a card product already exists, yet was not produced using a card creation script.

Once a batch of cards has been issued, a decision may be made to add a new application (or applications) to the cards. In this situation, an embodiment of the present invention may be used to build a new card creation script using updated card profile 230. Depending upon the type of card, either of the embodiments of FIGS. 6A–6C or 7A–7C may be used to build a new script. Preferably, the flowcharts are slightly modified to accommodate the creation of a new script for an already issued card (rather than for a yet-to-issue card). The following presents an example of how the flowchart of FIGS. 6A–6C may be modified to build a script 210' for a post-issuance load of a smart card.

Initially, an existing card product is targeted to be the subject of a post-issuance load. Step 518 (select card profile) is preferably performed at the beginning of the process and is used to select updated card profile 230 that corresponds to the existing card product. In step 500, the profiles for the previously loaded applications are selected, as well as profiles for any new applications that are desired to be loaded onto the card. In this way, the new applications may be compared against the original applications that already exist on the card.

Regarding step 516, it may not be necessary to create a new file structure for the card. Preferably, the existing file structure is expanded to accommodate any new applications, for example, new files may be added to support any new applications. Step 532 may be empty as it might not be possible to change the physical attributes of a card once it has been issued. When a card is issued, it has already been embossed, had graphics printed thereon, and had information added to its magnetic stripe. It is contemplated, however, that certain of the physical attributes may be changed post-issuance. By way of example, data on the magnetic stripe may be changed.

Regarding step 534, the file structure need not be described anew, but any expansion to the file structure to accommodate new applications will be noted in the script. Steps 542–546 are modified to refer to any new applications to be loaded onto the smart card, rather than applications previously loaded. For instance, initialization for the new applications is described, along with any personalization information needed. Finally, a new combined data element table is produced that includes information relevant to any new applications. The newly built script 210' may now be used to perform post-issuance loading of a smart card.

Figure 13:
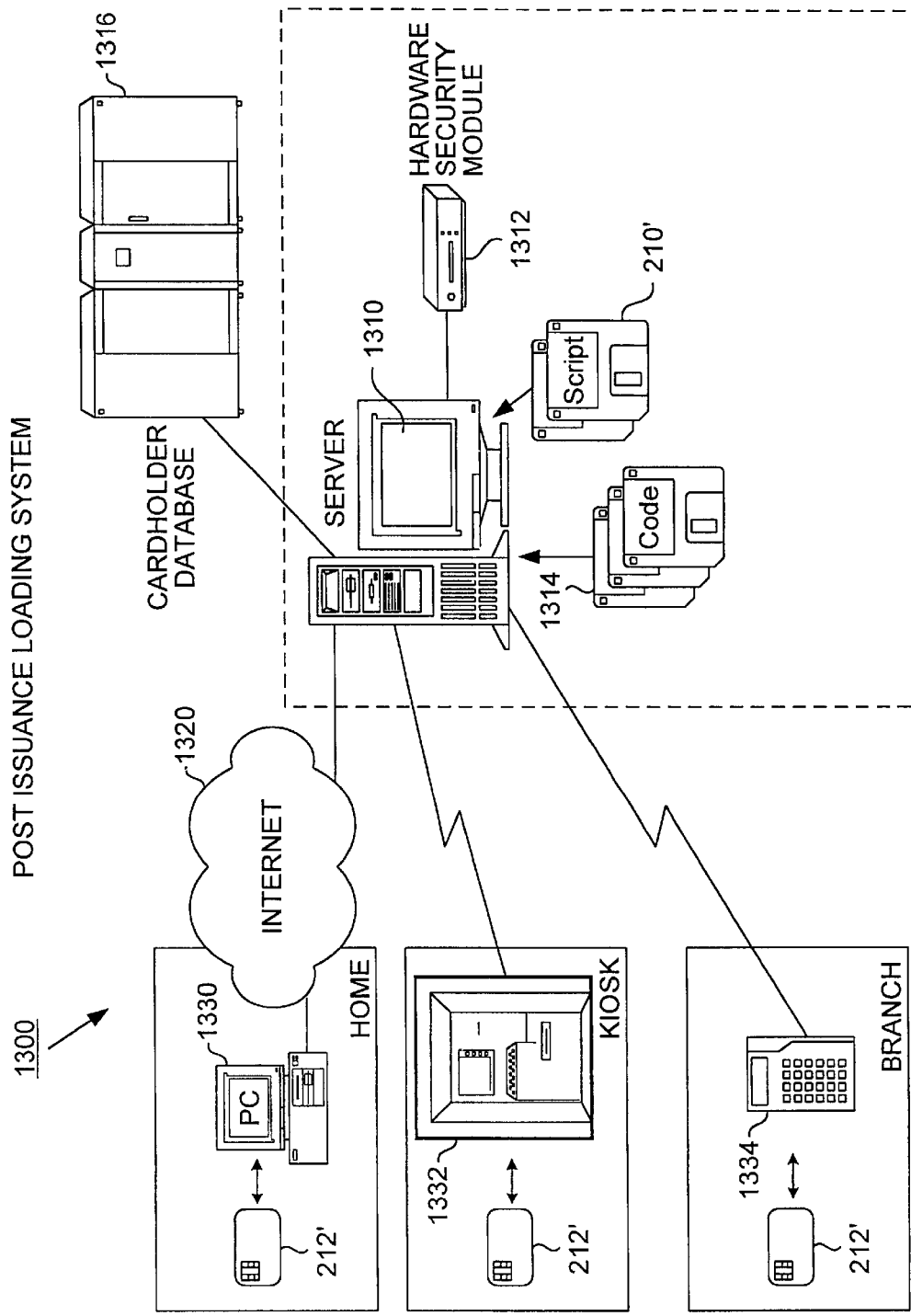
FIG. 13 is a block diagram of a system for installing an application post-issuance.

FIG. 13 is a block diagram of a system 1300 for installing an application post-issuance. Shown is newly built card creation script (CCS) 210' that is used to load new applications onto an existing card product. Server 1310 has an attached hardware security module (HSM) 1312, accepts new application code 1314, and communicates over internet 1320 (or other network) to a smart card 212'. Server 1310 is also in communication with a cardholder database 1316 that holds personalization data about each cardholder that is relevant to particular applications. For example, database 1316 may hold frequent flyer numbers for a loyalty application to be loaded onto cards.

Server 1310 is any suitable computer system for reading script 210' and transmitting instructions and code 1314 over a network to a smart card. Preferably, server 1310 controls the interaction with remote smart card 212' and the terminal at the other end need not be an intelligent terminal.

Hardware security module (HSM) 1312 is used to facilitate cryptographic processing. HSM 1312 typically stores secret keys and encryption algorithms, performs cryptographic functions on secret data and generates session keys and signatures. As is known in the art, HSM 1312 is generally a tamper proof device, which uses some level of physical security measures to protect the sensitive information inside. HSM 1312 may be any security module used in the industry, such as a RACAL HSM Model RG7000, or the security box attached to automatic teller machines. In alternative embodiments, HSM 1312 may be implemented on a smart card within a card reader, on a series of smart cards, may be implemented on any suitably secure computer, or may be implemented in software.

Application code 1314 is any suitable code for loading onto a smart card and may represent one application or many. In one embodiment, applications are written in the JAVA programming language, although assembly language, Visual Basic, C, and other languages may also be used to write applications.

Internet 1320 is any suitable network over which communication takes place between server 1310 and a remote terminal including a smart card. Although in one embodiment the Internet is used, the network may also be a telephone network, a GSM network, or other.

As shown in FIG. 13, post-issuance loading may occur in the home via a computer 1330, at a merchant kiosk 1332, or in a bank branch via a terminal 1334. In the home, a card reader terminal is attached to computer 1330 and smart card 212' is inserted into the terminal. Kiosk 1332 may be present at a merchant site or other location, or may take the form of an ATM. A card reader built into kiosk 1332 accepts smart card 212' for post-issuance loading. A terminal 1334 in a bank branch may also be used to accept smart card 212' for post-issuance loading. A portable terminal may also be used to accept a smart card for post-issuance loading.

The card reader terminals referred to may be any suitable terminal such as are known in the art for reading from, and writing to, a smart card, or the like. By way of example, terminals manufactured by Verifone, Hypercom, NCR, or others may be used. Also termed interface device (IFD), chip-accepting device (CAD), chip card reader (CCR), smart card adapter and card reader device, a terminal may be any suitable interface device that functions to transfer information and commands between a smart card and a user and/or a computing device. A terminal may be a non-intelligent device that simply provides power to a card and facilitates the transfer of information, or may be as complex as a merchant terminal that includes a processor, application software, and the ability to communicate over a network.

A terminal may take any of a variety of physical forms and may be a stand alone unit, integrated with a computer, attached to the keyboard of a computer, a PCMCIA card, or may even be built in to a floppy disk-sized unit capable of being read from a disk drive of a computer, etc. Furthermore, a terminal may also be embodied in any portable device such as a laptop computer, a cellular telephone, or any variety of a personal digital assistant (PDA).

Figure 14:
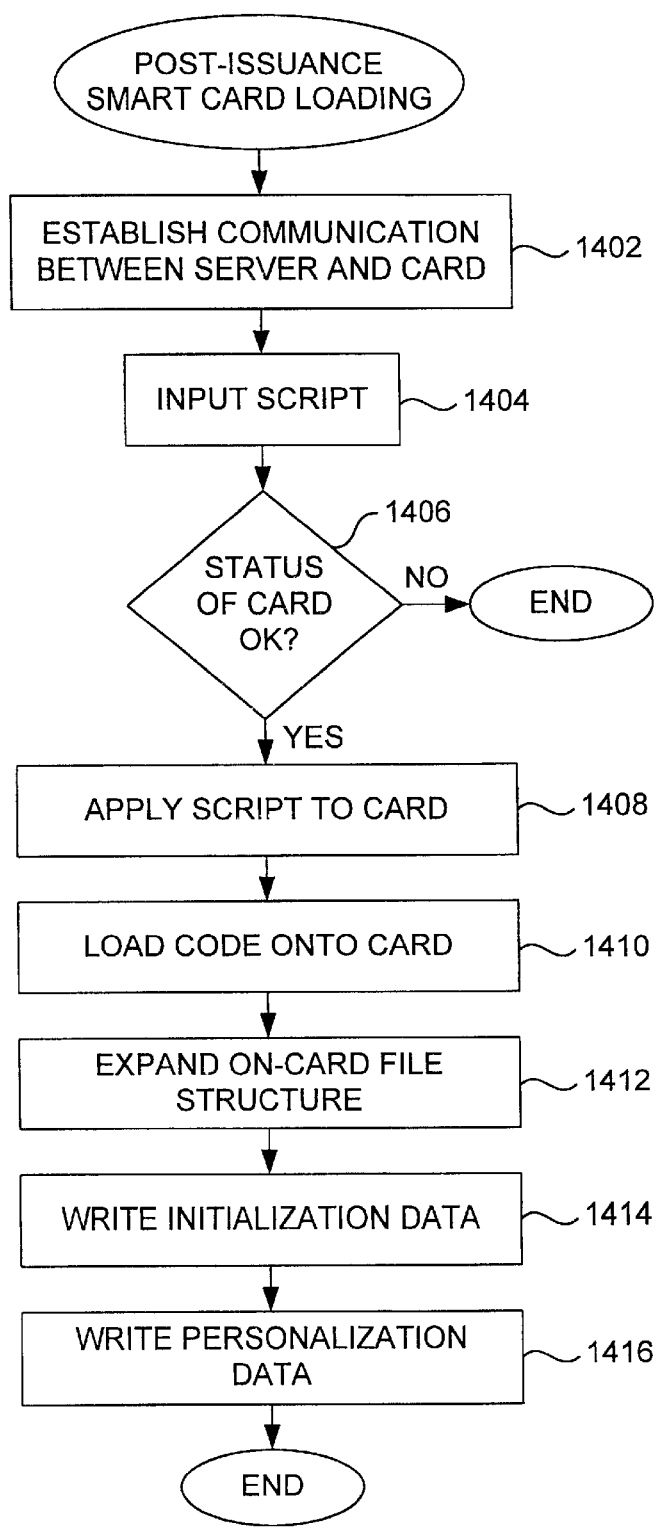
FIG. 14 is a flowchart describing a method for loading an application post-issuance.

FIG. 14 is a flowchart describing a method for loading an application post-issuance. Communication is first established (step 1402) between server 1310 and a smart card 212' that has been inserted into a terminal, for example, in conjunction with computer 1330, kiosk 1332, terminal 1334, or other suitable terminal. Techniques for communicating over a network with a smart card are known in the art. Next, script 210' is input to server 1310 (step 1404). The status of the card is checked (step 1406) to determine if the state of the card is that which the script is expecting. The life cycle of the card may be checked, along with identifying which applications are present on the card and the life cycle status of each application. The script may expect the card to be in a particular state before post-issuance loading may occur. If the status is not what is expected, the process ends.

If, however, the status is OK, then script 210' is applied to card 212' (step 1408) under control of server 1310 over network 1320. In this embodiment, server 1310 receives script 210', application source files 1314, cardholder data from database 1316, and encryption keys from HSM 1312. The server uses the script to load applications onto the smart card. One of skill in the art may readily write a parser program to process a script and control the server.

When script 210' is applied, application code 1314 is loaded onto card 212' (step 1410) and the on-card file structure is expanded on the card (step 1412) to accommodate the new applications. Also, any application initialization data is written onto the card (step 1414) as well as any personalization data (step 1416) needed by a particular application. Personalization data might include data from database 1316 that is specific to the cardholder and useful for a particular application, such as the cardholder's identification number, credit limit, airline seat preference, etc. Cryptographic keys may also be loaded onto the card during the initialization and personalization steps. Card 212' is then ready to be released to the customer with the new applications having been loaded and ready for use.

In a further embodiment of the invention, a multi-step personalization process may be used. In this scenario, a first issuer may build a card creation script that is used to initialize and personalize a batch of cards for a particular use. As part of this process, the first issuer builds an updated card profile to accompany these cards. The batch of cards is then delivered to a second issuer who desires to further personalize the cards (and/or add more applications). The second issuer uses the updated card profile (which characterizes the current status and resources of the batch of cards) received from the first issuer to create a second script that will further personalize the cards or add more applications. This embodiment is useful if the issuers wish to divide the labor, if the issuers are separated by great distances, if certain personalization data and/or applications are only available to the second issuer, or if the second issuer has data or keys it wishes to remain secret from the first issuer.

Computer System Embodiment

Figure 15:
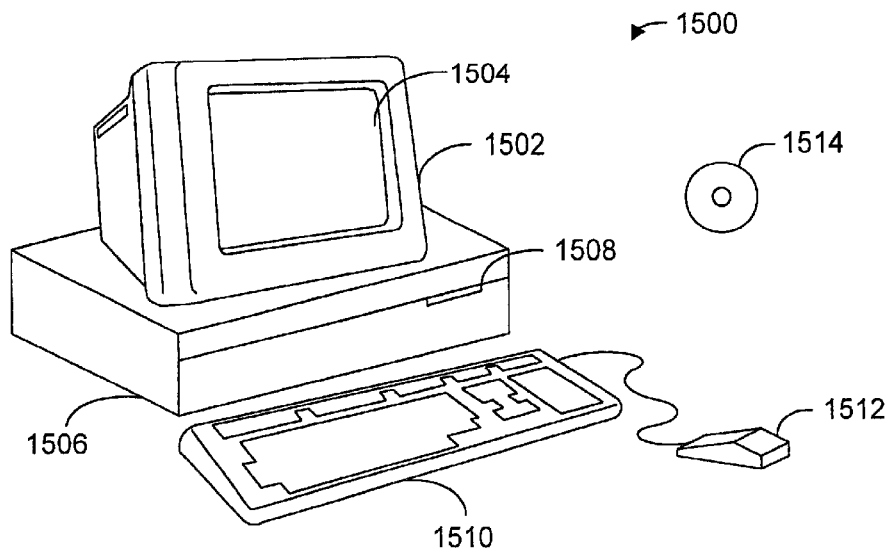
FIGS. 15 and 16 illustrate a computer system 900 suitable for implementing embodiments of the present invention.
Figure 16:
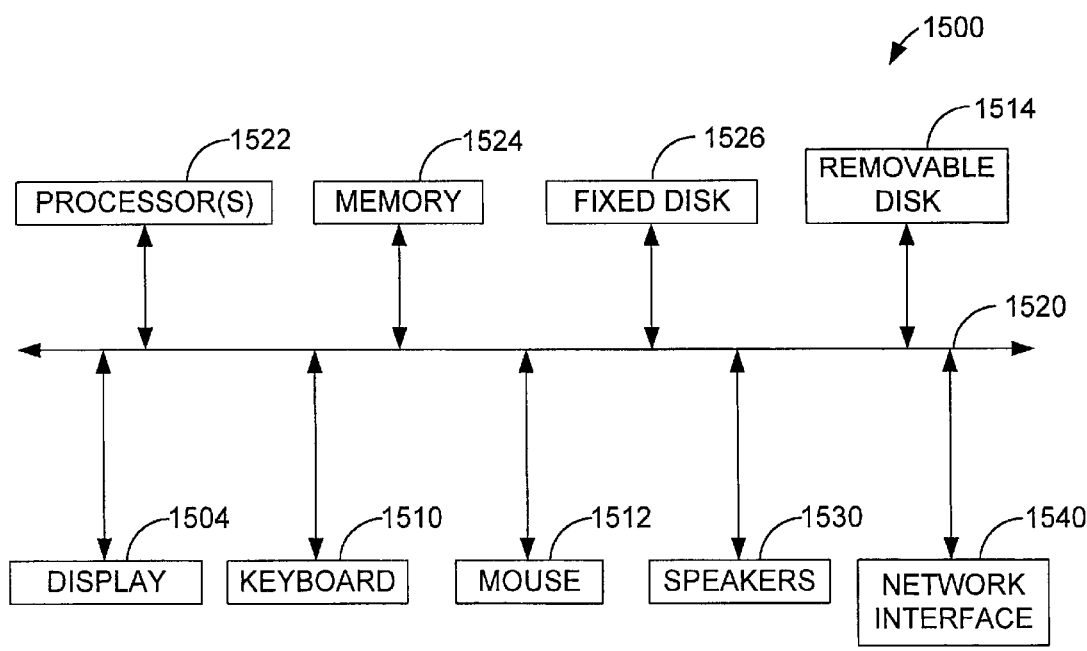

FIGS. 15 and 16 illustrate a computer system 1500 suitable for implementing embodiments of the present invention. FIG. 15 shows one possible physical form of the computer system. Of course, the computer system may have many physical forms ranging from an integrated circuit, a printed circuit board and a small handheld device up to a huge super computer. Computer system 1500 includes a monitor 1502, a display 1504, a housing 1506, a disk drive 1508, a keyboard 1510 and a mouse 1512. Disk 1514 is a computer-readable medium used to transfer data to and from computer system 1500.

FIG. 16 is an example of a block diagram for computer system 1500. Attached to system bus 1520 are a wide variety of subsystems. Processor(s) 1522 (also referred to as central processing units, or CPUs) are coupled to storage devices including memory 1524. Memory 1524 includes random access memory (RAM) and read-only memory (ROM). As is well known in the art, ROM acts to transfer data and instructions uni-directionally to the CPU and RAM is used typically to transfer data and instructions in a bidirectional manner. Both of these types of memories may include any suitable of the computer-readable media described below. A fixed disk 1526 is also coupled bi-directionally to CPU 1522; it provides additional data storage capacity and may also include any of the computer-readable media described below. Fixed disk 1526 may be used to store programs, data and the like and is typically a secondary storage medium (such as a hard disk) that is slower than primary storage. It will be appreciated that the information retained within fixed disk 1526, may, in appropriate cases, be incorporated in standard fashion as virtual memory in memory 1524. Removable disk 1514 may take the form of any of the computer-readable media described below.

CPU 1522 is also coupled to a variety of input/output devices such as display 1504, keyboard 1510, mouse 1512 and speakers 1530. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other to computers. CPU 1522 optionally may be coupled to another computer or telecommunications network using network interface 1540. With such a network interface, it is contemplated that the CPU might receive information from the network, or might output information to the network in the course of performing the above-described method steps. Furthermore, method embodiments of the present invention may execute solely upon CPU 1522 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. For instance, the invention is applicable to a wide variety of traditional smart cards, multi-application smart cards and smart cards similar to Open Platform smart cards. The script builder can use a variety of information in addition to application profiles, card and issuer profiles and user input. The script may appear in many formats and be written using different languages. Also, any of a number of personalization devices or other card production hardware may be used to interpret the script and to create a smart card. In addition, it is possible to choose a card profile first (original or updated), and then select applications that are compatible with that card profile, rather than choosing applications first and then finding a card profile to match. Therefore, the described embodiments should be taken as illustrative and not restrictive, and the invention should not be limited to the details given herein but should be defined by the following claims and their full scope of equivalents.

APPENDIX

```
// Script Example – EMV + Bank Account + Store-Value
// Applications Load, Initialization, & Personalization
//Header Script Information
DATE: 01-Dec-1998
AUTHOR: Visa International
ISSUER: My Bank
REVISION: 1.0
CARD PROFILE: ICC_PRO
APP PROFILE: EMV_PRO
APP PROFILE: Bank_Account_PRO
APP PROFILE: Stored_Value_PRO
//Header Script Validation
CARD    Card_OP_Version         ==    APP    EMV_OP_Version
CARD    Card_OP_Version         ==    APP    Bank_Account_OP_Version
CARD    Card_OP_Version         ==    APP    Stored_Value_OP_Version
CARD    Card_CryptoCPU          ==    APP    EMV_CryptoCPU
CARD    Card_CryptoCPU          ==    APP    Bank_Account_CryptoCPU
CARD    Card_CryptoCPU          ==    APP    Stored_Value_CryptoCPU
CARD    Card_RAM_Avail          >+    APP    EMV_RAM_Rqd
CARD    Card_RAM_Avail          >+    APP    Bank_Account_RAM_Rqd
CARD    Card_RAM_Avail          >+    APP    Stored_Value_RAM_Rqd
CARD    Card_EEPROM_Avail       >+    APP    EMV_Code + EMV_Data +
                                             Bank_Account_Code +
                                             Bank_Account_Data +
                                             Stored_Value_Code +
                                             Stored_Value_Data
CARD    Card_JCVM_Version       ==    APP    EMV_JCVM_Version
CARD    Card_JCVM_Version       ==    APP    Stored_Value_JCVM_Version
CARD    Card_JCVM_Version       ==    APP    Stored_Value_JCVM_Version
APP     EMV_App(AID)            ==    APP    Bank_Account_EMV_Name
APP     EMV_APP(AID)            ==    APP    Stored_Value_EMV_Name
APP     EMV_Version             ==    APP    Bank_Account_EMV_Version
```

APPENDIX-continued

| APP | EMV_Version | == | APP | Stored_Value_EMV_Version |
| CARD | Card_Domain(AID) | == | APP | EMV_Domain_Name |
| CARD | Card_Domain(AID) | == | APP | Bank_Account_Domain_Name |
| CARD | Card_Domain(AID) | == | APP | Stored_Value_Domain_Name |
| CARD | Card_Domain_Version | == | APP | EMV_Domain_Version |
| CARD | Card_Domain_Version | == | APP | Bank_Account_Domain_Version |
| CARD | Card_Domain_Version | == | APP | Stored_Value_Domain_Version |

SCRIPT FILE (Filename:Bank_Account_Emboss)
Emboss %Account_Number(ext) on %Front at %Line_1 with
font %OCR-A and color %Gold
Emboss %Cardholder_Name(ext) on %Front at %Line_2 with
font %OCR-A and color %Gold
//MAGNETIC STRIPE
SCRIPT FILE (Filename:Bank_Account_Magstripe)
Encode %Account_Number(ext) on %Track_2 starting with
%Start_Sentinel and finishing with %End_Sentinel
//INITIALIZATION
Reset_Card
//Card Domain AID already registered
Select %CardDomain_FCI %By_Name using %CardDomain_AID
Generate %Server_Challenge
Init_Update %IU_RespData from %Server_Challenge using
%CardDomain_KeySetID and %CardDomain_KeyIndex
//Compute session key INI_S derived from key INI_D
Derive %Key_INI_S from %Key_INI_D using
%(%IU_RespData(REF 15:4)|%Server_Challenge(REF 0:4))
// Authentication of personalization equipment by card
Crypto %Cryptogram using %Key_INI_S from %IU_RespData(REF
11:8)
Ext_Authenticate %Cryptogram
//Load EMV application
SCRIPT FILE (Filename:EMV_Load)
Install %EMV_App(AID) for %Load with %Null using
%Card_SecurityDomain and %No_InstallParameters
Load %EMV_App(CAP)
//Initialize EMV application
SCRIPT FILE (Filename:EMV_Install)
Install %EMV_App(AID) for %Install with %Null using
%Card_SecurityDomain and %No_InstallParameters
//Load Bank Account application
SCRIPT FILE (Filename:Bank_Account_Load)
Install %Bank_Account_App(AID) for %Load with %Null using
%Card_SecurityDomain and %No_InstallParameters
Load %Bank_Account_App(CAP)
//Initialize Bank Account application
SCRIPT FILE (Filename:Bank_Account_Install)
Install %Bank_Account_App(AID) for %Install with %Null
using %Card_SecurityDomain and %No_InstallParameters
//Load Stored Value application
SCRIPT FILE (Filename:Stored_Value_Load)
Install %Stored_Value_App(AID) for %Load with %Null using
%Card_SecurityDomain and %No_InstallParameters
Load %VisaCah_App(CAP)
// Initialize Stored Value application
SCRIPT FILE (Filename:Stored_Value_Install)
Install %Stored_Value_App(AID) for %Install with %Null
using %Card_SecurityDomain and %No_InstallParameters
//PERSONALIZATION
//Personalize Bank Account application
SCRIPT FILE (Filename:Bank_Account_Perso)
//Write Account Number & Cardholder Name in Bank Account
Record
Select %Bank_Account_FCI %By_Name using
%Bank_Account_App(AID)
Update_Rec %Bank_Account_Rec_Number using
%Bank_Account_File_Ref with
%Rec_Template(TL=) (%Account_Number(TLV) (ext)|%Cardolder_N
ame(TLV) (ext))
//Append EMV Directory
Select %EMV_FCI %By_Name using %EMV_App(AID)
Append_Rec %EMV_File_Ref with
%Rec_Template(TL=) (%App_Template(TL=) (%Bank_Account_App(A
ID) (TLV)|%Bank_Account_Label(TLV)))
//Personalize Stored Value application
SCRIPT FILE (Filename:Stored_Value_Perso)
//Write Maximum Balance and Currency in Stored Value
//Balance File
Select %Stored_Value_FCI %By_Name using
%Stored_Value_App(AID)

APPENDIX-continued

```
Write_Binary % Stored_Value_File_Ref at offset %Null with
(%Currency_Code&Exponent(ext)|%Cardholder_Maximum_Balance
(ext))
//Append EMV Directory
Select %EMV_FCI %By_Name using %EMV_App(AID)
Append_Rec %EMV_File_Ref with
%Rec_Template(TL=) (%App_Template(TL=) (%Stored_Value_App(A
ID) (TLV)|%Stored_Value_Label(TLV)))
```

We claim:

1. A method of building a smart card creation script for use in producing a smart card, said method comprising:

receiving an application profile representative of a software application intended for said smart card, said application profile describing requirements of said software application;

selecting a card profile describing resources of said smart card;

receiving issuer data common amongst a plurality of smart cards;

a step for performing the function of building a smart card creation script using said application profile, said card profile, and said issuer data, said smart card creation script being generic to any type of personalization equipment and being arranged to be interpreted by said personalization equipment, whereby said smart card creation script may be used to produce a smart card.

2. A method as recited in claim 1 further comprising:
receiving references to said cardholder data; and
building said smart card creation script using said references to said cardholder data, whereby said script may be used to personalize a smart card.

3. A method as recited in claim 1 further comprising:
comparing said card profile to said application profile;
determining whether said smart card represented by said card profile can support said software application; and
wherein when it is determined that said smart card cannot support said software application, selecting another card profile describing resources of another smart card.

4. A method as recited in claim 1 further comprising:
selecting a plurality of application profiles, each being representative of a software application intended for said smart card, said application profiles describing requirements of said software applications; and
building said smart card creation script using said application profiles, whereby said script may be used to produce a multiple application smart card.

5. A method as recited in claim 4 further comprising:
comparing said application profiles;
determining whether one of said software applications is incompatible with another of said software applications; and
wherein when it is determined that one of said software applications is incompatible with another, selecting a different application profile.

6. A system for building a smart card creation script for use in producing a smart card, said system comprising:
a computer;
a first computer file including application profile data, said application profile data representative of a software application intended for said smart card, said application profile data describing requirements of said software application;

a second computer file including card profile data, said card profile data describing resources of said smart card;

a third computer file including issuer data, said issuer data common amongst a plurality of smart cards; and software means for performing the function of building a smart card creation script using said first, second and third computer files, said smart card creation script being generic to any type of personalization equipment and being arranged to be interpreted by said personalization equipment, whereby said smart card creation script may be used to produce a smart card.

7. A system as recited in claim 6 further comprising:
a fourth computer file including references to said cardholder data, whereby said software means also uses said fourth computer file and said script may be used to personalize a smart card.

8. A system as recited in claim 6 further comprising:
a plurality of computer files, each including application profile data representative of a software application intended for said smart card, said application profile data files describing requirements of said software applications, whereby said software means also uses said plurality of computer files and said script may be used to produce a multiple application smart card.

9. A smart card creation script data structure embodied in a computer-readable medium, said script data structure comprising:
a physical section including physical attributes of said smart card;
an initialization section including card common data to be written to said smart card;
a personalization section including unique data to be written to said smart card; and
a data table including values or references for data used by an application of said smart card, said smart card creation script data structure being generic to any type of personalization equipment and being arranged to be interpreted by said personalization equipment, whereby said script data structure may be used to produce a smart card having said application.

10. A smart card creation script data structure as recited in claim 9 further comprising:
an identity section including a plurality of application names identifying applications to be loaded onto said smart card; and
a functions section including functions for loading said applications onto said smart card, whereby said script data structure may be used to produce a smart card having multiple applications.

11. A method of building a smart card creation script for use in producing a smart card, said method comprising:
receiving an application profile representative of a software application of said smart card, said application profile describing requirements of said software application;

receiving a card profile describing resources of said smart card;

comparing said application profile to said card profile;

writing a physical section of said smart card creation script including physical attributes of said smart card; and writing an initialization section of said smart card creation script including data common amongst a plurality of smart cards; whereby said smart card creation script may be used to produce a smart card.

12. A method as recited in claim 11 further comprising:

determining whether said smart card represented by said card profile can support said software application; and wherein when it is determined that said smart card cannot support said software application, selecting another card profile describing resources of another smart card.

13. A method as recited in claim 11 further comprising:

selecting a plurality of application profiles, each being representative of a software application intended for said smart card, said application profiles describing requirements of said software applications; and writing an identity section of said smart card creation script including a plurality of application names identifying said software applications to be loaded onto said smart card, whereby said script may be used to produce a multiple application smart card.

14. A method as recited in claim 13 further comprising:

comparing said application profiles;

determining whether one of said software applications is incompatible with another of said software applications; and wherein when it is determined that one of said software applications is incompatible with another, selecting a different application profile.

15. A method as recited in claim 13 further comprising:

creating a combined file structure from file structures of said software applications;

describing said combined file structure in said script;

creating a combined data table from data tables of said software applications; and writing said combined data table to said script, whereby said script may be used to produce a multi-application smart card.

16. A method of building a smart card creation script for use in producing a multi-application smart card, said method comprising:

receiving a plurality of application profiles each representative of a software application intended for said smart card, each application profile describing requirements of said corresponding software application;

comparing said application profiles to determine compatibility of said software applications;

receiving a card profile describing resources of said smart card;

determining whether said resources of said smart card are sufficient for said software applications; and writing an identity section of said smart card creation script including names of said software applications of said smart card, whereby said smart card creation script may be used to produce a multi-application smart card.

17. A method as recited in claim 16 further comprising:

wherein when it is determined that said resources of said smart card are not sufficient for said software applications, selecting another card profile describing resources of another smart card.

18. A method as recited in claim 16 further comprising:

determining whether one of said software applications is incompatible with another of said software applications; and wherein when it is determined that one of said software applications is incompatible with another, selecting a different application profile.

19. A method as recited in claim 16 further comprising:

writing an initialization section of said smart card creation script including data common amongst a plurality of smart cards; and writing a personalization section of said smart card creation script including unique card data of said smart card, whereby said script may be used to both initialize and to personalize multi-application smart cards.

20. A method as recited in claim 16 further comprising:

creating a combined file structure from file structures of said software applications;

describing said combined file structure in said script;

creating a combined data table from data tables of said software applications; and writing said combined data table to said script, whereby said script may be used to produce a multi-application smart card.

21. A method of producing an updated card profile for a smart card, said method comprising:

receiving a card profile describing resources of a smart card;

identifying an application to be loaded onto said smart card;

determining an amount of memory to be available on said smart card after loading of said application onto said smart card; and modifying said card profile to include an identification of said application and an indication of said amount of memory on said smart card, said modification producing an updated card profile reflecting said application and said amount of memory, whereby said updated card profile may be used in a post-issuance load or in a multi-step personalization of said smart card.

22. A method as recited in claim 21 further comprising:

building a script for producing said smart card having said application; and producing said updated card profile during said building of said script.

23. A method as recited in claim 21 wherein said received card profile is a profile of an issued smart card and reflects applications loaded and memory available of said issued smart card.

24. A method of building a smart card loading script for use in post-issuance loading of an issued smart card, said method comprising:

producing an updated card profile reflecting a status of said issued smart card;

receiving an application profile representative of a software application intended for said issued smart card, said application profile describing requirements of said software application;

selecting said updated card profile identifying an application loaded on and resources of said issued smart card;

comparing said updated card profile to said application profile; and a step for performing the function of building a smart card loading script using said application profile and said updated card profile, whereby said smart card loading script may be used to load said software application onto said issued smart card.

25. A method as recited in claim 24 further comprising:

receiving cardholder data related to said software application; and building said smart card loading script using said cardholder data, whereby said script may be used to personalize said software application intended for said smart card.

26. A method as recited in claim 24 further comprising:

determining whether said smart card represented by said updated card profile can support said software application; and wherein when it is determined that said smart card cannot support said software application, selecting another application profile describing requirements of another software application.

27. A method as recited in claim 24 further comprising:

selecting a plurality of application profiles, each being representative of a software application intended for said issued smart card, said application profiles describing requirements of said software applications; and building said smart card loading script using said application profiles, whereby said script may be used to load multiple applications onto said issued smart card.

28. A method as recited in claim 27 further comprising:

comparing said application profiles;

determining whether one of said software applications is incompatible with another of said software applications; and wherein when it is determined that one of said software applications is incompatible with another, selecting a different application profile.

29. A system for building a smart card loading script for use in post-issuance of an issued smart card, said system comprising:

a computer;

a first computer file including application profile data, said application profile data representative of a software application intended for said issued smart card, said application profile at describing requirements of said software application;

a second computer file including updated card profile data which reflects a status of said issued smart card, said updated card profile data identifying application loaded on and resource of said issued smart card;

softwear means for comparing said first computer file to said to said second computer file; and software means for performing the function of building a smart card loading script using said first and second computer files, whereby said smart card loading script may be used to load said software application onto said issued smart card.

30. A system as recited in claim 29 further comprising:

a third computer file including references to cardholder data related to said software application, whereby said software means also uses said third computer file and said script may be used to personalize said software application intended for said issued smart card.

31. A system as recited in claim 29 further comprising:

a plurality of computer files, each including application profile data representative of a software application intended for said smart card, said application profile data files describing requirements of said software applications, whereby said software means also uses said plurality of computer files and said script may be used to load multiple applications onto said issued smart card.

32. A method of building a smart card loading script for use in loading multiple applications onto an issued smart card, said method comprising:

receiving a plurality of application profiles each representative of a software application intended for said issued smart card, each application profile describing requirements of said corresponding software application;

comparing said application profiles to determine compatibility of said software applications;

receiving an updated card profile identifying an application loaded on and describing resources of said issued smart card;

determining whether said resources of said issued smart card are sufficient for said software applications; and writing an identity section of said smart card loading script including names of said software applications of said issued smart card, whereby said smart card loading script may be used to load said multiple applications onto said issued smart card.

33. A method as recited in claim 32 further comprising:

wherein when it is determined that said resources of said issued smart card are not sufficient for said software applications, selecting another updated card profile describing resources of another issued smart card.

34. A method as recited in claim 32 further comprising:

determining whether one of said software applications is incompatible with another of said software applications; and wherein when it is determined that one of said software applications is incompatible with another, selecting a different application profile.

35. A method as recited in claim 32 further comprising:

writing a personalization section of said smart card loading script including unique card data for said issued smart card, whereby said script may be used to personalize one of said software application smart cards.

36. A method as recited in claim 32 further comprising:

creating an expanded file structure from file structures of said software applications;

describing said expanded file structure in said script;

creating a combined data table from data tables of said software applications; and writing said combined data table to said script, whereby said script may be used to load said software applications onto said issued smart card.

* * * * *

UNITED STATES PATENT AND TRADEMARK OFFICE
CERTIFICATE OF CORRECTION

PATENT NO.    : 6,402,028 B1
DATED         : June 11, 2002
INVENTOR(S)   : Graham, Jr. et al.

It is certified that error appears in the above-identified patent and that said Letters Patent is hereby corrected as shown below:

Column 33,
Line 46, "at" should read -- data --.
Line 53, "softwear" should read -- software --.

Signed and Sealed this

Fourth Day of January, 2003

JAMES E. ROGAN
*Director of the United States Patent and Trademark Office*